US009311781B2

(12) United States Patent
Edwards

(10) Patent No.: US 9,311,781 B2
(45) Date of Patent: Apr. 12, 2016

(54) GAMING SYSTEM AND METHOD FOR PROVIDING A CASCADING SYMBOL GAME WITH UPGRADE EVENTS

(71) Applicant: IGT, Las Vegas, NV (US)

(72) Inventor: Stephen J. Edwards, Walnut Creek, CA (US)

(73) Assignee: IGT, Las Vegas, NV (US)

( * ) Notice: Subject to any disclaimer, the term of this patent is extended or adjusted under 35 U.S.C. 154(b) by 317 days.

(21) Appl. No.: 14/028,884

(22) Filed: Sep. 17, 2013

(65) Prior Publication Data

US 2015/0080094 A1 Mar. 19, 2015

(51) Int. Cl.
*A63F 13/00* (2014.01)
*G07F 17/32* (2006.01)

(52) U.S. Cl.
CPC .................................... *G07F 17/326* (2013.01)

(58) Field of Classification Search
CPC ........................... G07F 17/3244; G07F 17/326
USPC ................................................ 463/16, 20, 31
See application file for complete search history.

(56) References Cited

U.S. PATENT DOCUMENTS

| | | | |
|---|---|---|---|
| 4,099,722 | A | 7/1978 | Rodesch et al. |
| 4,200,291 | A | 4/1980 | Hooker |
| 4,357,567 | A | 11/1982 | Rock |
| 4,636,951 | A | 1/1987 | Harlick |
| 4,695,053 | A | 9/1987 | Vazquez et al. |
| 4,790,537 | A | 12/1988 | Smyth et al. |
| 4,826,169 | A | 5/1989 | Bessho et al. |
| 4,874,173 | A | 10/1989 | Kishishita |
| 5,205,555 | A | 4/1993 | Hamano |
| RE34,244 | E | 5/1993 | Hagiwara |
| 5,395,111 | A | 3/1995 | Inoue |
| 5,564,700 | A | 10/1996 | Celona |
| 5,624,119 | A | 4/1997 | Leake |

(Continued)

FOREIGN PATENT DOCUMENTS

| | | |
|---|---|---|
| AU | 755879 | 2/2001 |
| EP | 0058488 | 8/1982 |

(Continued)

OTHER PUBLICATIONS

Gonzo's Quest Video Slot brochure written by Net Entertainment in 2014.

(Continued)

*Primary Examiner* — James S McClellan
(74) *Attorney, Agent, or Firm* — Neal, Gerber & Eisenberg LLP

(57) ABSTRACT

A gaming system including a cascading symbol or tumbling reel game which utilizes zero, one or more upgrades in association with zero, one or more shifting symbols. Upon an occurrence of an upgrade event, the gaming system upgrades one or more aspects or attributes of one or more games played. In certain embodiments, such upgrades pertain to upgrading one or more symbols displayed at one or more symbol display positions of one or more symbol display position grids. In certain other embodiments, such upgrades pertain to upgrading the award evaluation of one or more symbols displayed at one or more symbol display positions of one or more symbol display position grids. In certain other embodiments, such upgrades pertain to upgrading one or more attributes or features of one or more bonus or secondary games which are subsequently triggered.

20 Claims, 18 Drawing Sheets

(56) References Cited

U.S. PATENT DOCUMENTS

| | | | |
|---|---|---|---|
| 5,704,835 | A | 1/1998 | Dietz, II |
| 5,720,662 | A | 2/1998 | Holmes et al. |
| 5,722,891 | A | 3/1998 | Inoue |
| 5,769,716 | A | 6/1998 | Saffari et al. |
| 5,807,172 | A | 9/1998 | Piechowiak |
| 5,813,911 | A | 9/1998 | Margolin |
| 5,833,537 | A | 11/1998 | Barrie |
| 5,882,260 | A | 3/1999 | Marks et al. |
| 5,934,672 | A | 8/1999 | Sines et al. |
| 5,951,397 | A | 9/1999 | Dickinson |
| 5,980,384 | A | 11/1999 | Barrie |
| 6,089,977 | A | 7/2000 | Bennett |
| 6,117,013 | A | 9/2000 | Eiba |
| 6,120,377 | A | 9/2000 | McGinnis et al. |
| 6,139,124 | A | 10/2000 | Kling |
| 6,174,235 | B1 | 1/2001 | Walker et al. |
| 6,186,894 | B1 | 2/2001 | Mayeroff |
| 6,203,009 | B1 | 3/2001 | Sines et al. |
| 6,220,959 | B1 | 4/2001 | Holmes et al. |
| 6,224,484 | B1 | 5/2001 | Okuda et al. |
| 6,227,971 | B1 | 5/2001 | Weiss |
| 6,241,607 | B1 | 6/2001 | Payne et al. |
| 6,251,013 | B1 | 6/2001 | Bennett |
| 6,254,481 | B1 | 7/2001 | Jaffe |
| 6,270,412 | B1 | 8/2001 | Crawford et al. |
| 6,311,976 | B1 | 11/2001 | Yoseloff et al. |
| 6,318,721 | B1 | 11/2001 | Randall et al. |
| 6,347,996 | B1 | 2/2002 | Gilmore et al. |
| 6,394,902 | B1 | 5/2002 | Glavich et al. |
| 6,398,644 | B1 | 6/2002 | Perrie et al. |
| 6,398,645 | B1 | 6/2002 | Yoseloff |
| 6,409,602 | B1 | 6/2002 | Wilshire et al. |
| 6,413,162 | B1 | 7/2002 | Baerlocher et al. |
| 6,419,579 | B1 | 7/2002 | Bennett |
| 6,464,581 | B1 | 10/2002 | Yoseloff et al. |
| 6,517,432 | B1 | 2/2003 | Jaffe |
| 6,604,740 | B1 | 8/2003 | Singer et al. |
| 6,634,945 | B2 | 10/2003 | Glavich et al. |
| 6,641,477 | B1 | 11/2003 | Dietz |
| 6,666,767 | B1 | 12/2003 | Dayan |
| 6,676,511 | B2 | 1/2004 | Payne et al. |
| 6,676,512 | B2 | 1/2004 | Fong et al. |
| 6,682,420 | B2 | 1/2004 | Webb et al. |
| 6,695,696 | B1 | 2/2004 | Kaminkow |
| 6,702,671 | B2 | 3/2004 | Tarantino |
| 6,712,693 | B1 | 3/2004 | Hettinger |
| 6,715,756 | B2 | 4/2004 | Inoue |
| 6,731,313 | B1 | 5/2004 | Kaminkow |
| 6,805,349 | B2 | 10/2004 | Baerlocher et al. |
| 6,832,957 | B2 | 12/2004 | Falconer |
| 6,855,054 | B2 | 2/2005 | White et al. |
| 6,875,106 | B2 | 4/2005 | Weiss et al. |
| 6,884,165 | B2 | 4/2005 | Baerlocher |
| 6,896,617 | B2 | 5/2005 | Daly |
| 6,905,405 | B2 | 6/2005 | McClintic |
| 6,910,962 | B2 | 6/2005 | Marks et al. |
| 6,921,334 | B1 | 7/2005 | Bennett |
| 6,942,571 | B1 | 9/2005 | McAllister et al. |
| 6,960,133 | B1 | 11/2005 | Marks et al. |
| 6,981,917 | B2 | 1/2006 | Webb et al. |
| 6,986,709 | B2 | 1/2006 | Hughs-Baird et al. |
| 6,997,805 | B2 | 2/2006 | Vancura |
| 7,014,560 | B2 | 3/2006 | Glavich et al. |
| 7,052,395 | B2 | 5/2006 | Glavich et al. |
| 7,070,502 | B1 | 7/2006 | Bussick et al. |
| 7,077,745 | B2 | 7/2006 | Gomez et al. |
| 7,108,602 | B2 | 9/2006 | Daly |
| 7,144,322 | B2 | 12/2006 | Gomez et al. |
| 7,195,559 | B2 | 3/2007 | Gilmore et al. |
| 7,252,591 | B2 | 8/2007 | Van Asdale |
| 7,278,919 | B2 | 10/2007 | Souza et al. |
| 7,294,058 | B1 | 11/2007 | Slomiany et al. |
| 7,311,607 | B2 | 12/2007 | Tedsen et al. |
| 7,357,713 | B2 | 4/2008 | Marks et al. |
| 7,371,174 | B2 | 5/2008 | Baerlocher |
| 7,399,228 | B2 | 7/2008 | Baerlocher |
| 7,513,827 | B2 | 4/2009 | Baerlocher |
| 7,513,828 | B2 | 4/2009 | Nguyen et al. |
| 7,547,252 | B2 | 6/2009 | Peterson et al. |
| 7,597,618 | B2 | 10/2009 | Webb et al. |
| 7,611,406 | B2 | 11/2009 | Fuller |
| 7,614,947 | B2 | 11/2009 | Baerlocher |
| 7,666,085 | B2 | 2/2010 | Vorias et al. |
| 7,699,698 | B2 | 4/2010 | Randall |
| 7,717,787 | B2 | 5/2010 | Walker et al. |
| 7,749,063 | B2 | 7/2010 | Belger et al. |
| 7,753,773 | B2 | 7/2010 | Baerlocher et al. |
| 7,785,196 | B2 | 8/2010 | Baerlocher et al. |
| 7,815,503 | B2 | 10/2010 | Walker et al. |
| 7,867,080 | B2 | 1/2011 | Nicely et al. |
| 7,871,323 | B2 | 1/2011 | Walker et al. |
| 7,874,904 | B2 | 1/2011 | Randall |
| 7,914,373 | B2 | 3/2011 | Webb et al. |
| 7,914,376 | B2 | 3/2011 | Walker et al. |
| 7,950,994 | B2 | 5/2011 | Berman et al. |
| 8,083,581 | B2 | 12/2011 | Marks et al. |
| 8,105,151 | B2 | 1/2012 | Caputo et al. |
| 8,152,623 | B2 | 4/2012 | Fiden |
| 8,162,741 | B2 | 4/2012 | Wadleigh et al. |
| 8,192,272 | B2 | 6/2012 | Thomas et al. |
| 8,192,275 | B2 | 6/2012 | Aoki et al. |
| 8,221,206 | B2 | 7/2012 | Marks et al. |
| 8,277,308 | B2 | 10/2012 | Baerlocher et al. |
| 8,287,357 | B2 | 10/2012 | Evans |
| 8,323,091 | B2 | 12/2012 | Frank et al. |
| 8,366,538 | B1 | 2/2013 | Saunders et al. |
| 8,371,930 | B1 | 2/2013 | Saunders et al. |
| 8,414,380 | B2 | 4/2013 | Saunders et al. |
| 8,444,473 | B2 | 5/2013 | Ching et al. |
| 8,449,390 | B2 | 5/2013 | Kaminkow |
| 8,512,138 | B2 | 8/2013 | Saunders |
| 8,602,871 | B2 | 12/2013 | Wadleigh et al. |
| 2002/0068623 | A1 | 6/2002 | Gauselmann |
| 2002/0077165 | A1 | 6/2002 | Bansemer et al. |
| 2003/0008698 | A1 | 1/2003 | Stone |
| 2003/0027622 | A1 | 2/2003 | Osawa |
| 2003/0027623 | A1 | 2/2003 | Rose |
| 2003/0036422 | A1 | 2/2003 | Baerlocher et al. |
| 2003/0045345 | A1 | 3/2003 | Bermin |
| 2003/0054874 | A1 | 3/2003 | Kaminkow |
| 2003/0057645 | A1 | 3/2003 | Baerlocher |
| 2003/0060267 | A1 | 3/2003 | Glavich |
| 2003/0100356 | A1 | 5/2003 | Brown et al. |
| 2003/0157981 | A1 | 8/2003 | Marks et al. |
| 2004/0005919 | A1 | 1/2004 | Walker et al. |
| 2004/0033829 | A1 | 2/2004 | Pacey et al. |
| 2004/0043809 | A1 | 3/2004 | Gomez et al. |
| 2004/0048646 | A1 * | 3/2004 | Visocnik ................. G07F 17/32 463/16 |
| 2004/0048650 | A1 | 3/2004 | Mierau et al. |
| 2004/0048651 | A1 | 3/2004 | Vorias et al. |
| 2004/0097280 | A1 | 5/2004 | Gauselmann |
| 2005/0037836 | A1 | 2/2005 | Gilmore et al. |
| 2005/0059478 | A1 | 3/2005 | Peterson et al. |
| 2005/0096114 | A1 | 5/2005 | Cannon et al. |
| 2005/0148381 | A1 | 7/2005 | Marks et al. |
| 2005/0282620 | A1 | 12/2005 | Marks et al. |
| 2005/0288094 | A1 | 12/2005 | Marks et al. |
| 2006/0046830 | A1 | 3/2006 | Webb |
| 2006/0068881 | A1 | 3/2006 | Casey |
| 2006/0068886 | A1 | 3/2006 | Takano et al. |
| 2006/0073884 | A1 | 4/2006 | Walker et al. |
| 2006/0172795 | A1 | 8/2006 | Bussick et al. |
| 2007/0026933 | A1 | 2/2007 | Tanimura |
| 2007/0060248 | A1 | 3/2007 | Rodgers et al. |
| 2007/0155474 | A1 | 7/2007 | Gauselmann |
| 2007/0275777 | A1 | 11/2007 | Walker et al. |
| 2008/0045309 | A1 | 2/2008 | Okada |
| 2008/0051174 | A1 | 2/2008 | Fiden |
| 2008/0090655 | A1 | 4/2008 | Marks et al. |
| 2008/0108409 | A1 | 5/2008 | Cole et al. |
| 2008/0113735 | A1 | 5/2008 | Maya |
| 2008/0182644 | A1 | 7/2008 | Lutnick et al. |
| 2008/0227521 | A1 | 9/2008 | Aoki et al. |

(56) References Cited

U.S. PATENT DOCUMENTS

| | | | |
|---|---|---|---|
| 2009/0104964 A1 | 4/2009 | Snow | |
| 2009/0124325 A1* | 5/2009 | Wadleigh ................ | G07F 17/34 463/20 |
| 2009/0124342 A1 | 5/2009 | Fong | |
| 2009/0124347 A1 | 5/2009 | Rodgers et al. | |
| 2009/0170590 A1* | 7/2009 | Thomas .............. | G07F 17/3265 463/20 |
| 2009/0227337 A1 | 9/2009 | Langille et al. | |
| 2010/0022297 A1 | 1/2010 | Saunders | |
| 2010/0029364 A1 | 2/2010 | Zielinski | |
| 2010/0120507 A1 | 5/2010 | Rodgers et al. | |
| 2010/0124972 A1 | 5/2010 | Rodgers | |
| 2010/0234089 A1 | 9/2010 | Saffari et al. | |
| 2010/0234091 A1 | 9/2010 | Baerlocher et al. | |
| 2011/0111825 A1 | 5/2011 | Caputo | |
| 2011/0130193 A1 | 6/2011 | Belger et al. | |
| 2013/0143635 A1 | 6/2013 | Arora et al. | |
| 2013/0190066 A1 | 7/2013 | Saunders et al. | |
| 2013/0190067 A1 | 7/2013 | Saunders | |

FOREIGN PATENT DOCUMENTS

| | | |
|---|---|---|
| EP | 0060019 | 9/1982 |
| EP | 1063622 | 12/2000 |
| GB | 1454046 | 10/1976 |
| GB | 2062922 | 5/1981 |
| GB | 2106293 | 9/1981 |
| GB | 2097160 | 10/1982 |
| GB | 2106295 | 4/1983 |
| GB | 2165385 | 4/1986 |
| GB | 2180087 | 8/1989 |
| GB | 2243236 | 4/1990 |
| GB | 2372132 | 2/2001 |
| WO | WO 98/20949 | 5/1998 |
| WO | WO 00/30727 | 6/2000 |
| WO | WO 2006/076294 | 7/2006 |
| WO | WO 2007/002935 | 1/2007 |
| WO | WO 2007/130443 | 11/2007 |
| WO | WO 2007/130444 | 11/2007 |

OTHER PUBLICATIONS

Elvis the King brochure written by IGT in 2014.

Invaders from the Planet Moolah brochure written by WMS in 2013.

Pyramid of the Kings brochure written by WMS in 2013.

* cited by examiner

GAMING SYSTEM AND METHOD FOR PROVIDING A CASCADING SYMBOL GAME WITH UPGRADE EVENTS

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur provide higher awards. In such known gaming machines, the amount of the wager made on the base game by the player can vary.

Gaming machines which provide cascading symbol or tumbling reel games are also known. In one such cascading symbol or tumbling reel game, a gaming machine generates and displays a plurality of symbols in a symbol display position matrix or grid. This symbol display position matrix includes a plurality of symbol display positions. Each symbol display position is associated with a specific row and a specific column of the symbol display position matrix. In such a cascading symbol game, the gaming machine evaluates the displayed symbols and provides an award for each winning symbol combination formed. The gaming machine then removes the displayed symbols that form any winning symbol combination to create one or more empty symbol display positions. The gaming machine shifts zero, one, or more of the remaining displayed symbols downward into zero, one, or more of the created empty symbol display positions. If any empty symbol display positions remain, the gaming machine generates and displays a symbol for each remaining empty symbol display position. The gaming machine then evaluates the displayed symbols and provides any award for any winning symbol combinations formed. If winning symbol combinations continue to be formed, the gaming machine repeats the steps of removing generated symbols, shifting generated symbols, generating new symbols, and evaluating generated symbols until no winning symbol combinations remain.

There is a continuing need to increase the level of excitement and entertainment for people playing gaming machines. There is a further need for increasing the number of winning symbol combinations generated and awards provided to a player for a single wager on a play of a game.

SUMMARY

The present disclosure relates generally to gaming systems and methods for providing a cascading symbol game with one or more upgrade events.

In various embodiments, the gaming system disclosed herein includes a cascading symbol or tumbling reel game which utilizes zero, one or more upgrades in association with zero, one or more shifting symbols. In these embodiments, upon an occurrence of an upgrade event, such as the shifting of one or more designated symbols into one or more designated symbol display positions, the gaming system upgrades one or more aspects or attributes of one or more games played. In certain embodiments, such upgrades pertain to upgrading one or more symbols displayed at one or more symbol display positions of one or more symbol display position grids. In certain other embodiments, such upgrades pertain to upgrading the award evaluation of one or more symbols displayed at one or more symbol display positions of one or more symbol display position grids. In certain other embodiments, such upgrades pertain to upgrading one or more attributes or features of one or more bonus or secondary games which are subsequently triggered. In these embodiments, the upgrade of one or more symbols, one or more award evaluations and/or one or more bonus game attributes increases the excitement and enjoyment for certain players by providing one or more additional (and/or more lucrative) award opportunities for such players.

More specifically, in operation of certain embodiments, for a play of a game and in association with: (i) an initial generation of one or more symbols in one or more symbol display positions of one or more symbol display position grids, (ii) a shifting of one or more previously generated symbols (following the removal of one or more generated symbols) into one or more created empty symbol display positions of one or more symbol display position grids, and/or (iii) a subsequent generation of one or more symbols (following any shifting of any previously generated symbols) into one or more symbol display positions of one or more symbol display position grids, the gaming system determines if an upgrade event has occurred.

In certain embodiments, the gaming system determines that an upgrade event occurred when a symbol (or a designated symbol) shifts from one symbol display position to another symbol display position. In certain other embodiments, the gaming system determines that an upgrade event occurred when a play of the cascading symbols game includes a designated quantity of shifting or repositioning of one or more symbols. In certain other embodiments, the gaming system determines that an upgrade event occurred when a symbol (or a designated symbol) is involved in a designated quantity of symbol shifts. In certain other embodiments, the gaming system includes a plurality of symbol display position grids wherein at least a first area, column or row of a first symbol display position grid is associated with or linked to at least a first area, column or row of a second symbol display position grid. In these embodiments, the gaming system determines that an upgrade event occurred when a symbol (or a designated symbol) shifts or transfers from one symbol display position grid (e.g., from a symbol display position of the first area, column or row of the first symbol display position grid) to another symbol display position grid (to a symbol display position of the linked first area, column or row of the second symbol display position grid).

In certain different embodiments, if the gaming system determines that an upgrade event has occurred, the gaming system upgrades one or more symbols displayed at one or more symbol display positions of one or more symbol display position grids. In one such embodiment, the gaming system upgrades a non-wild symbol into a wild symbol such that the wild symbol functions as or otherwise changes to a different symbol (e.g., a wild symbol causes a non-winning symbol combination to become a winning symbol combination). In another such embodiment, the gaming system upgrades a symbol from occupying one symbol display position to occupying a plurality of symbol display positions (and thus increases the probability of that modified symbol being part of a winning symbol combination). In another such embodiment, the gaming system upgrades a symbol to a split symbol including a plurality of symbols occupying a single symbol display position (and thus increasing the probability that a winning symbol combination is formed).

In certain different embodiments, if the gaming system determines that an upgrade event has occurred, the gaming system upgrades the award evaluation of one or more symbols displayed at one or more symbol display positions of one or more symbol display position grids. In one such embodiment, the gaming system upgrades the play of the cascading symbols game by adding one or more paylines and subsequently evaluating the symbols generated along the added paylines to determine if such symbols are associated with any awards. In another such embodiment, the gaming system upgrades the play of the cascading symbols game by adding one or more ways to win and subsequently evaluating the symbols associated with the added ways to win to determine if such symbols form any strings of symbols associated with any awards. In another such embodiment, the gaming system upgrades the play of the cascading symbols game by adding one or more symbol display positions to the symbol display position grid(s), generating symbols in such added symbol display positions and evaluating the additionally generated symbols to determine if such additionally generated symbols (in combination with zero, one or more previously generated symbols) are associated with any awards.

In certain different embodiments, if the gaming system determines that an upgrade event has occurred, the gaming system upgrades one or more attributes or features of one or more bonus or secondary games which are subsequently triggered. In one such embodiment, the gaming system upgrades the play of any subsequently triggered secondary game by increasing one or more positive attributes or features (e.g., increasing a quantity of picks, increasing a quantity of free spins, and/or increasing an amount of modifier) associated with the subsequently triggered secondary game. In another such embodiment, the gaming system alternatively or additionally upgrades the play of any subsequently triggered secondary game by decreasing one or more negative attributes or features (e.g., decreasing a quantity of terminator symbols, removing one or more lower valued award) associated with the subsequently triggered secondary game. In another such embodiment, the gaming system upgrades the play of any subsequently triggered secondary game by modifying the average expected payout and/or the volatility of the subsequently triggered secondary game.

In these embodiments, in addition to determining if any upgrade event occurred and correspondingly upgrading one or more symbols, one or more award evaluations and/or one or more bonus game attributes, the gaming system removes zero, one or more generated symbols (e.g., symbols which form part of a winning symbol combination) to create zero, one or more empty symbol display positions. The gaming system then shifts or repositions zero, one or more of the remaining displayed symbols into zero, one, or more of the created empty symbol display positions. Following the shifting or repositioning of zero, one or more symbols, if any empty symbol display positions remain, the gaming system generates and displays a symbol for each remaining empty symbol display position. The gaming system repeats this process until no more symbols are to be removed, such as when no more winning symbol combinations are formed. Such a configuration of removing symbols and generating additional symbols provides the player one or more additional award opportunities in association with one play of a game.

Additional features and advantages are described in, and will be apparent from, the following Detailed Description and the figures.

DETAILED DESCRIPTION

Cascading Symbol Game

In various embodiments, the gaming system disclosed herein includes a cascading symbol or tumbling reel game which utilizes zero, one or more upgrades in association with shifting or relocating zero, one or more symbols. In these embodiments, upon an occurrence of an upgrade event, such as the shifting one or more symbols (or designated symbols) into one or more symbol display positions (or designated symbol display positions), the gaming system upgrades one or more aspects or attributes of one or more games (such as one or more primary games or one or more secondary games). In certain embodiments, such upgrades pertain to upgrading one or more symbols displayed at one or more symbol display positions of one or more symbol display position matrices. In certain other embodiments, such upgrades pertain to upgrading an award evaluation of one or more symbols displayed at one or more symbol display positions of one or more symbol display position matrices. In certain other embodiments, such upgrades pertain to upgrading one or more attributes or features of one or more bonus or secondary games which are subsequently triggered. In these embodiments, the upgrade of one or more symbols, one or more award evaluations and/or one or more bonus game attributes increases the excitement and enjoyment for players by providing one or more additional (and/or more lucrative) award opportunities.

While certain of the embodiments described below are directed to playing a cascading symbol game as a primary or base game, it should be appreciated that the present disclosure may additionally or alternatively be implemented as a secondary or bonus game. Moreover, while the player's credit balance, the player's wager and/or any awards are displayed as an amount of monetary credits or currency in the embodiments described below, one or more of such player's credit balance, such player's wager, and any awards provided to such player may be for non-monetary credits, promotional credits, and/or player tracking points or credits.

Figure 1:
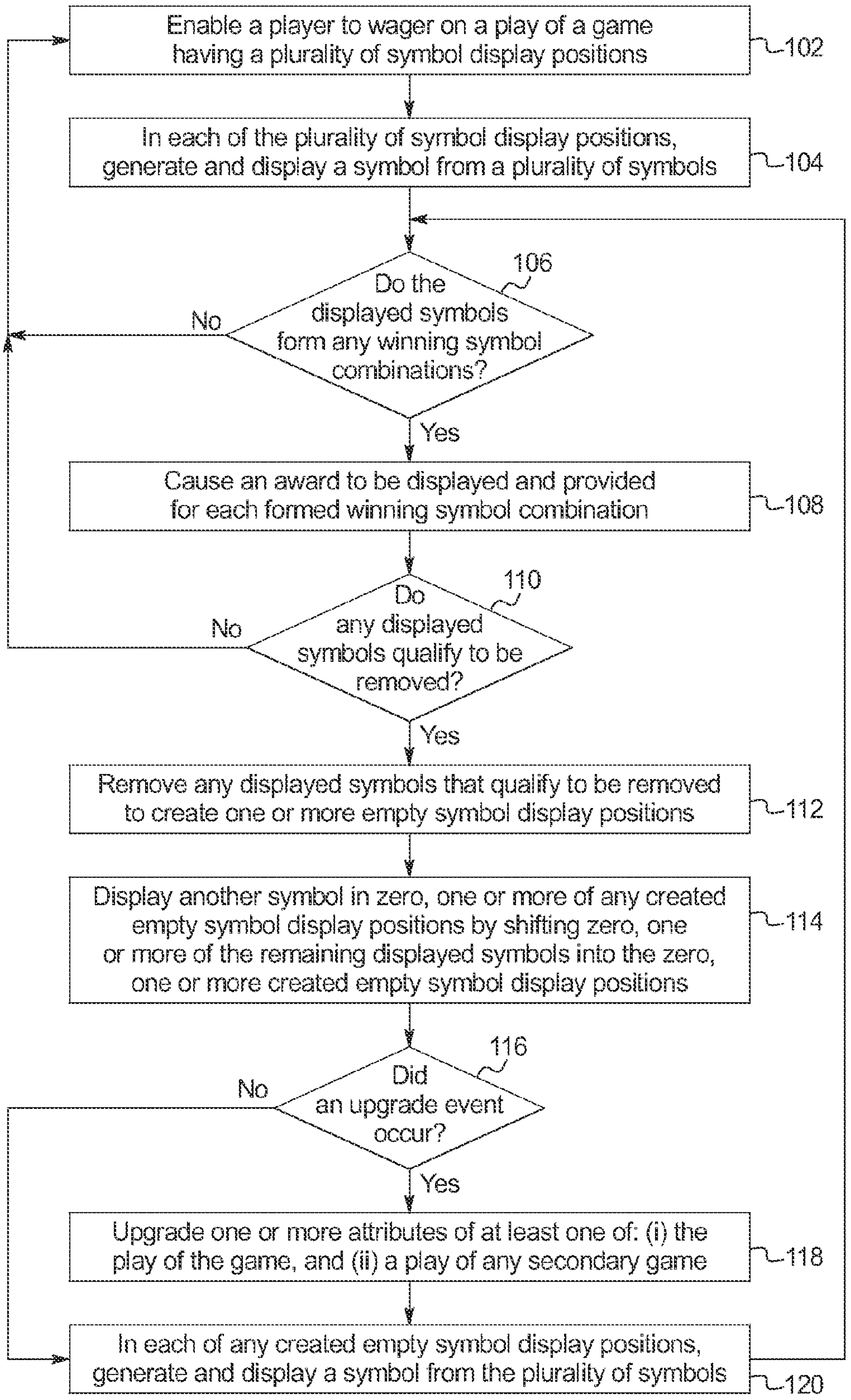
FIG. 1 is a flow chart of an example process for operating a gaming system providing one embodiment of a cascading symbol game which employs symbol upgrades as disclosed herein.

Referring now to FIG. 1, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In one embodiment, as indicated in block 102 of FIG. 1, the gaming system enables a player to wager on a play of a game having a plurality of symbol display positions. In one embodiment, the game is a cascading symbol or tumbling reel game and the symbol display positions are arranged to form a single symbol display position matrix or grid. In another embodiment, the symbol display positions are arranged to form a plurality of linked (or partially linked) symbol display position matrices or grids. In different embodiments, one or more symbol display position matrices are arranged in a plurality of rows and a plurality of columns or are arranged in any suitable configuration to form any suitable shape.

Figure 2A:
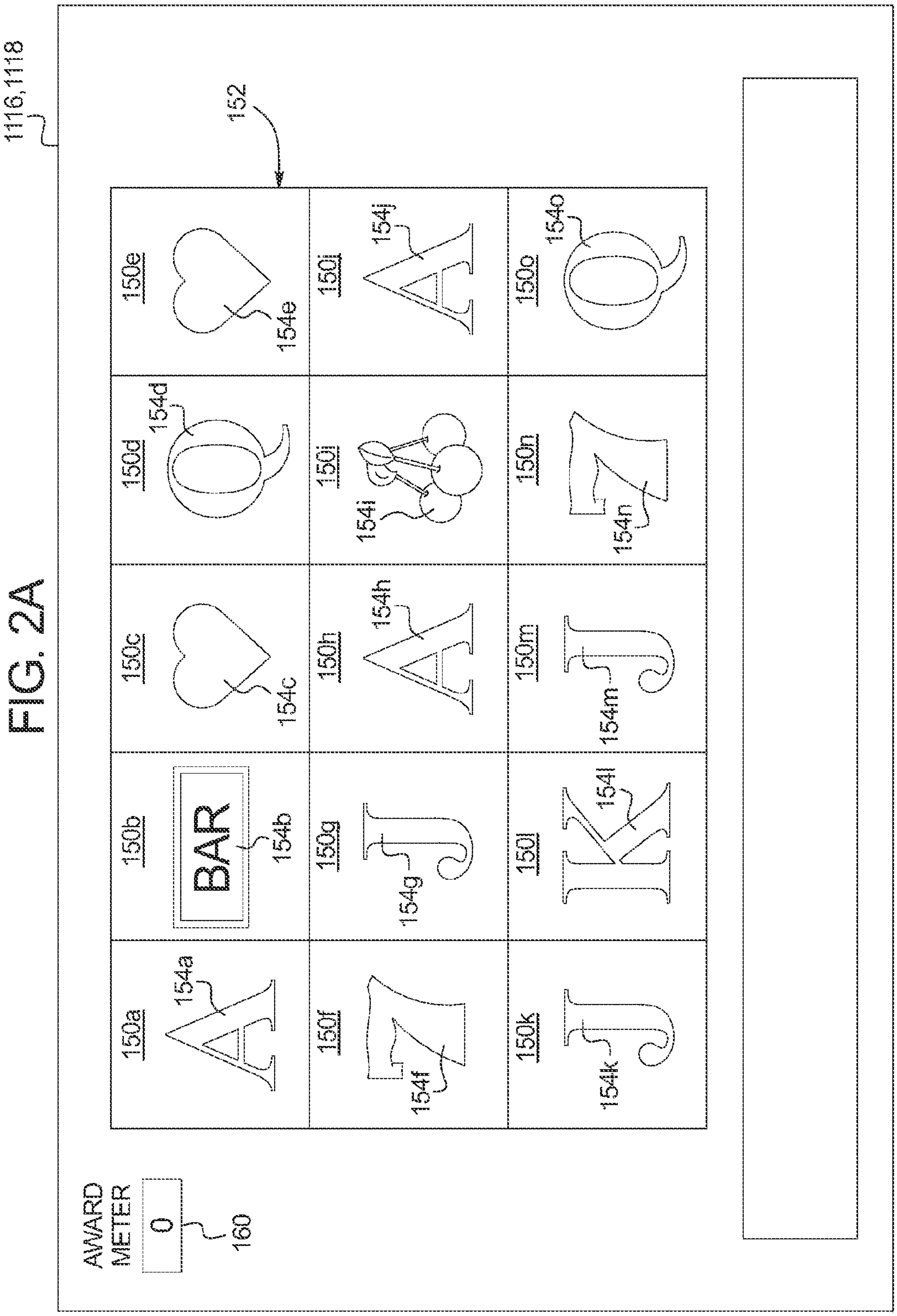
FIGS. 2A, 2B, 2C, 2D, 2E, 2F, 2G, 2H and 2I, are front views of one example embodiment of the gaming system disclosed herein illustrating a play of a cascading symbol game which employs one or more symbol upgrades.

For the wagered on play of the game, as indicated in block 104, at each of the plurality of symbol display positions, the gaming system generates and displays a symbol from a plurality of symbols. For example, as seen in FIG. 2A, at a plurality of symbol display positions 150 of a symbol display position matrix 152, the gaming system generates zero, one or more symbols 154. Specifically, as seen in FIG. 2A, the gaming system generates symbols 154*a*, 154*b*, 154*c*, 154*d*, 154*e*, 154*f*, 154*g*, 154*h*, 154*i*, 154*j*, 154*k*, 154*l*, 154*m*, 154*n* and 154*o* at symbol display positions 150*a*, 150*b*, 150*c*, 150*d*, 150*e*, 150*f*, 150*g*, 150*h*, 150*i*, 150*j*, 150*k*, 150*l*, 150*m*, 150*n* and 150*o*, respectively, of symbol display position matrix 152.

Following the display of the plurality of symbols in the plurality of symbol display positions, the gaming system determines whether the displayed symbols form any winning symbol combinations, as indicated in diamond 106 of FIG. 1.

In one embodiment, if the displayed symbols do not form any winning symbol combinations, the gaming system terminates the play of the game and returns to block 102 to await another wager on another play of the game. On the other hand, if the displayed symbols form one or more winning symbol combinations, the gaming system causes an award to be displayed and provided for each formed winning symbol combination, as indicated in block 108.

Figure 2B:
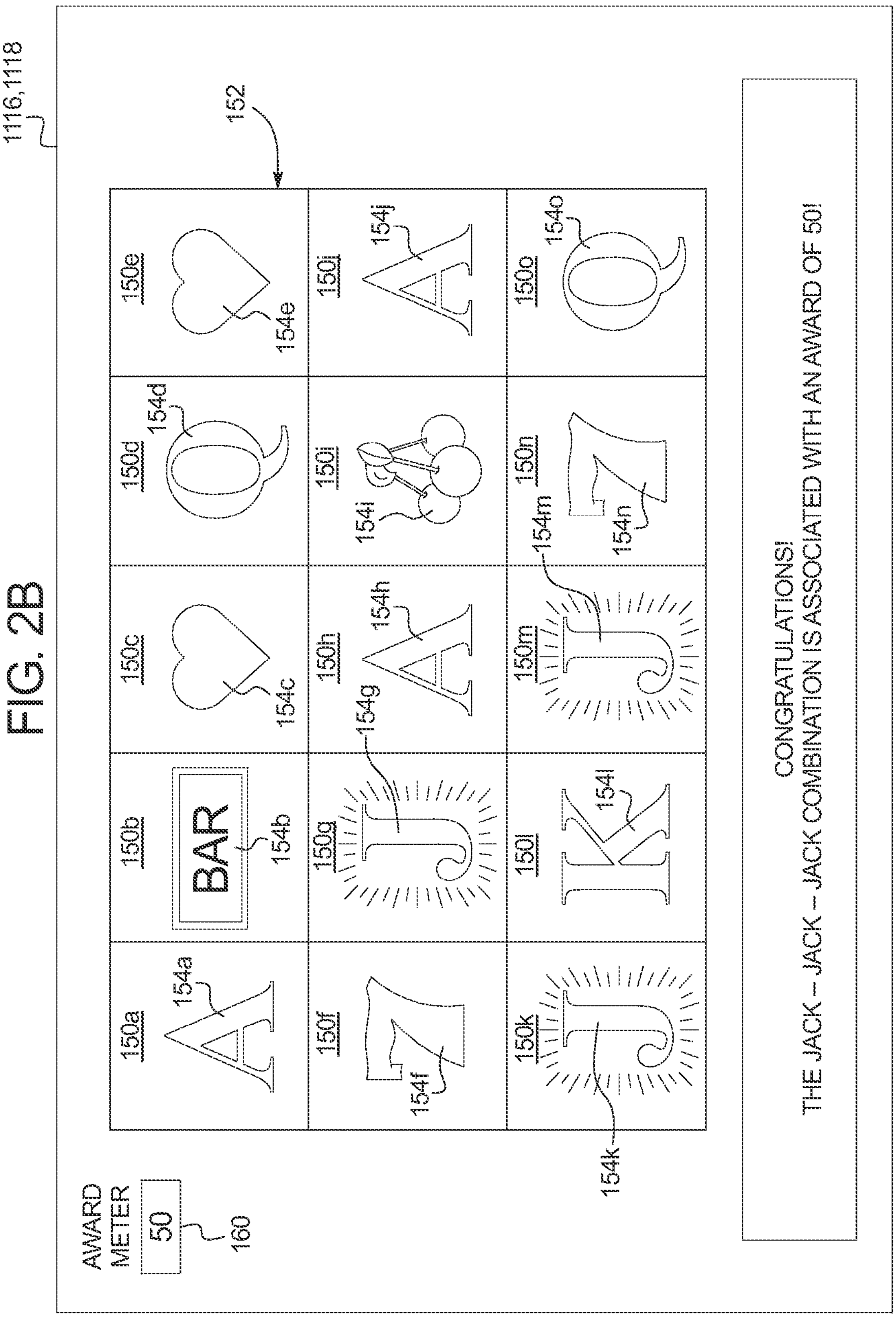

For example, as seen in FIG. 2B, upon determining that Jack symbol 154*k*-Jack symbol 154*g*-Jack symbol 154*m*, together, form a winning symbol combination, the gaming system causes an award of fifty credits to be provided to the player in association with this winning symbol combination (e.g., the gaming system increases the award meter 160 from zero credits to fifty credits). In this example, the gaming system provides appropriate messages such as "CONGRATULATIONS! THE JACK-JACK-JACK COMBINATION IS ASSOCIATED WITH AN AWARD OF 50!" to the player visually, or through suitable audio or audiovisual displays.

Following providing the player any awards associated with any winning symbol combinations, the gaming system determines whether any of the displayed symbols qualify to be removed, as indicated in diamond 110 of FIG. 1. That is, the gaming system determines whether to remove any symbols currently displayed at the plurality of symbol display positions.

If no displayed symbols qualify to be removed, the gaming system does not remove any of the plurality of symbols, terminates the play of the game and returns to block 102 to await another wager on another play of the game. On the other hand, as indicated in block 112, if one or more of the displayed symbols qualify to be removed, the gaming system removes such displayed symbols. It should be appreciated that, by removing one or more displayed symbols from the symbol display position matrix, the gaming system creates one or more empty symbol display positions.

Figure 2C:
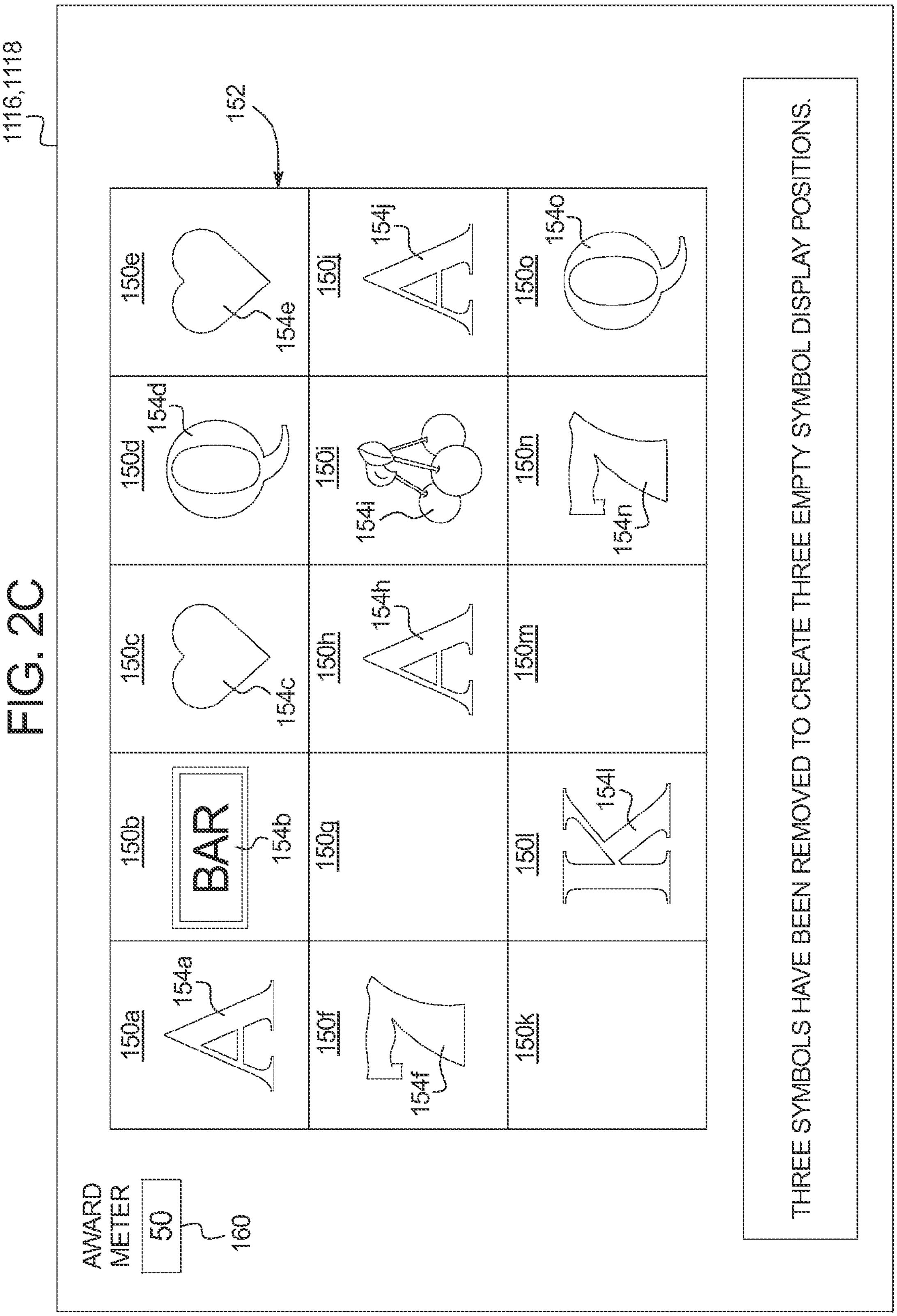

For example, as seen in FIG. 2C, the gaming system removes Jack symbol 154*k*. Jack symbol 154*g* and Jack symbol 154*m* from symbol display positions 150*k*, 150*g* and 150*m*, respectively. This removal creates empty symbol display positions 150*k*, 150*g* and 150*m*. In this example, the gaming system provides appropriate messages such as "THREE SYMBOLS HAVE BEEN REMOVED TO CREATE THREE EMPTY SYMBOL DISPLAY POSITIONS." to the player visually, or through suitable audio or audiovisual displays. In various embodiments, one or more displayed symbols which qualify to be removed include: (i) any symbol associated with a winning symbol combination, and/or (ii) any symbol not associated with any winning symbol combination.

Following the removal of one or more displayed symbols from one or more symbol display positions, the gaming system displays another symbol in zero, one or more of any created empty symbol display positions by shifting zero, one or more of the remaining displayed symbols into the zero, one or more created empty symbol display positions, as indicated in block 114 of FIG. 1. In various embodiments, shifting symbols downward (or upward, or sideways or diagonally or any suitable direction) to fill one or more empty symbol display positions causes a cascading, tumbling, or falling appearance of the symbols, which increases player excitement and enjoyment.

Figure 2D:
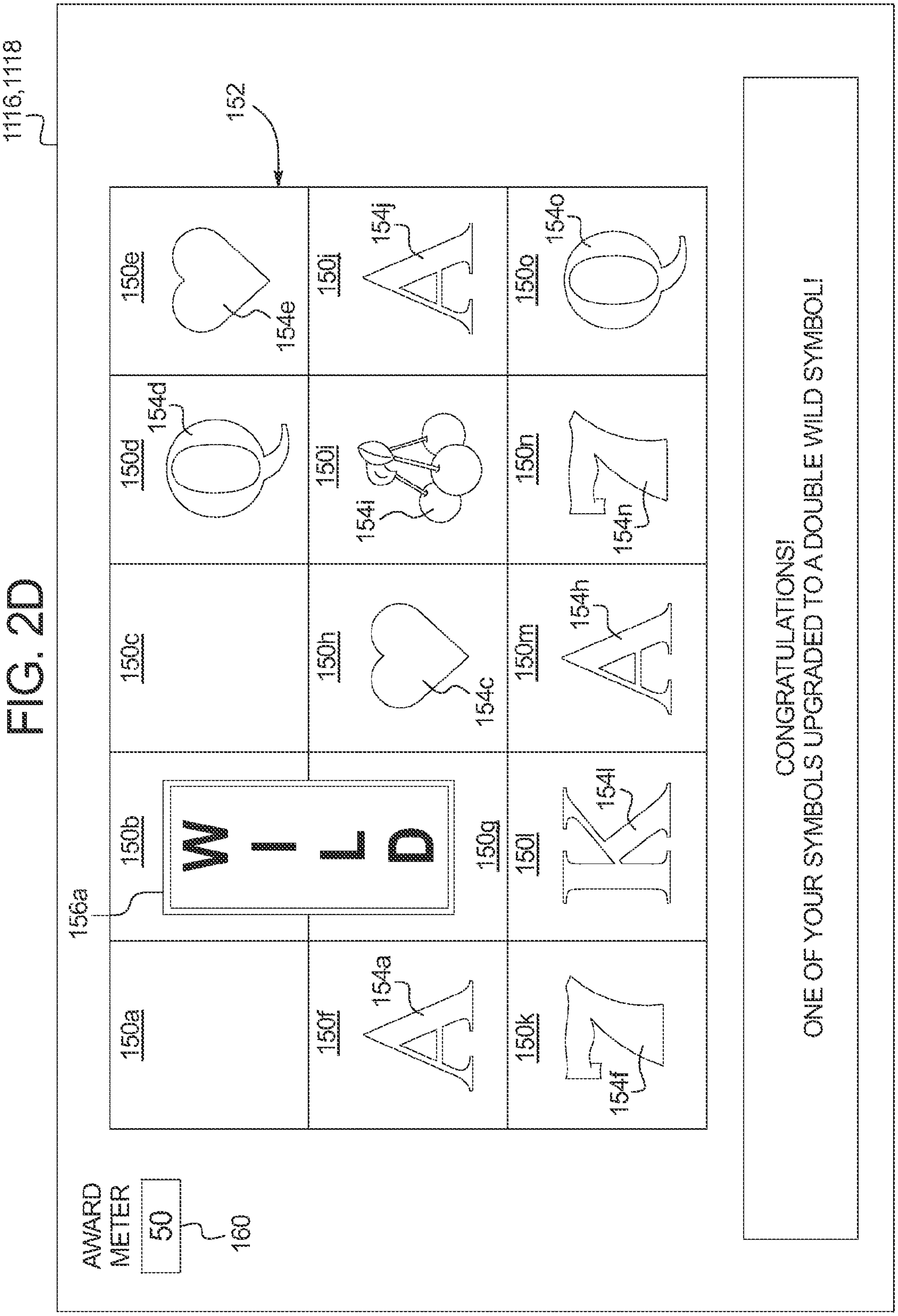

For example, as seen in FIG. 2D, following the creation of empty symbol display positions 150*k*, 150*g* and 150*m*, the gaming system shifts Ace symbol 154*a* and seven symbol 154*f* from symbol display positions 150*a* and 150*f*, respectively, into symbol display positions 150*f* and 150*k*, respectively. Additionally, the gaming system shifts heart symbol 154*c* and Ace symbol 154*h* from symbol display positions 150*c* and 150*h*, respectively, into symbol display positions 150*h* and 150*m*, respectively.

In various embodiments, the gaming system shifts zero, one or more symbols into zero, one or more of the created empty symbol display positions according to applicable game rules. For example, under one set of applicable game rules symbols (or designated symbols) are shifted downward to fill empty symbol display positions along a bottom row of symbol display positions. In this example, the gaming system shifts (or otherwise relocates) at least one displayed symbol in a symbol display position above an empty symbol display position downward to fill the empty symbol display position. In a similar example, under these applicable set of game rules, if a winning symbol combination results in an empty symbol display position along a top row of symbol display positions, the gaming system does not shift (or otherwise relocate) any of the displayed symbols to fill the empty symbol display position.

In different embodiments, the gaming system utilizes any combination of shifting (such as shifting downward, upward, sideways, diagonally, or any other suitable direction) displayed symbols or non-displayed symbols (such as symbols or designated symbols located in a position above a top row of symbol display positions) to fill one or more empty symbol display positions.

In one embodiment, in addition to removing zero, one or more symbols and in addition to shifting zero, one or more symbols, the gaming system determines if an upgrade event occurred, as indicated in diamond 116 of FIG. 1. In one embodiment, as described in more detail below, an upgrade event occurs based on one or more events which occur independent of any displayed event associated with any plays of any games. In another embodiment, as also described in more detail below, an upgrade event occurs based on (or as a result of) one or more displayed events occurring in association with one or more plays of one or more games.

As indicated in block 118, if an upgrade event occurs, the gaming system upgrades one or more attributes of at least one of: (i) the play of the game, and (ii) a play of any secondary game. In various embodiments, such upgrades persist for one or more plays of one or more primary games and/or one or more secondary games. In certain embodiments, such upgrades pertain to upgrading one or more symbols displayed at one or more symbol display positions of one or more symbol display position grids. For example, referring back to FIG. 2D, in association with removal of one or more symbols and the cascading of zero, one or more symbols during the play of the game (i.e., the occurrence of an upgrade event), the gaming system upgrades Bar symbol 154*b* to multiple symbol display position element (or symbol) 156*a* (discussed in greater detail below). In this example, the gaming system provides appropriate messages such as "CONGRATULATIONS! ONE OF YOUR SYMBOLS UPGRADED TO A DOUBLE WILD SYMBOL!" to the player visually, or through suitable audio or audiovisual displays. In certain other embodiments, such upgrades pertain to upgrading an award evaluation of one or more symbols displayed at one or more symbol display positions of one or more symbol display position matrices. In certain other embodiments, such upgrades pertain to upgrading one or more attributes or features of one or more bonus or secondary games which are subsequently triggered. It should be appreciated that upgrading one or more symbols, one or more award evaluations and/or one or more bonus game attributes provides one or more additional (and/or more lucrative) award opportunities for players and thus increases players' excitement and enjoyment.

In one embodiment, after upgrading one or more attributes of at least one of: (i) the play of the game, and (ii) a play of any secondary game, or if an upgrade event does not occur, the gaming system generates and displays, in each of any created empty symbol display positions, a symbol from the plurality of symbols, as indicated in block 120 of FIG. 1.

Figure 2E:
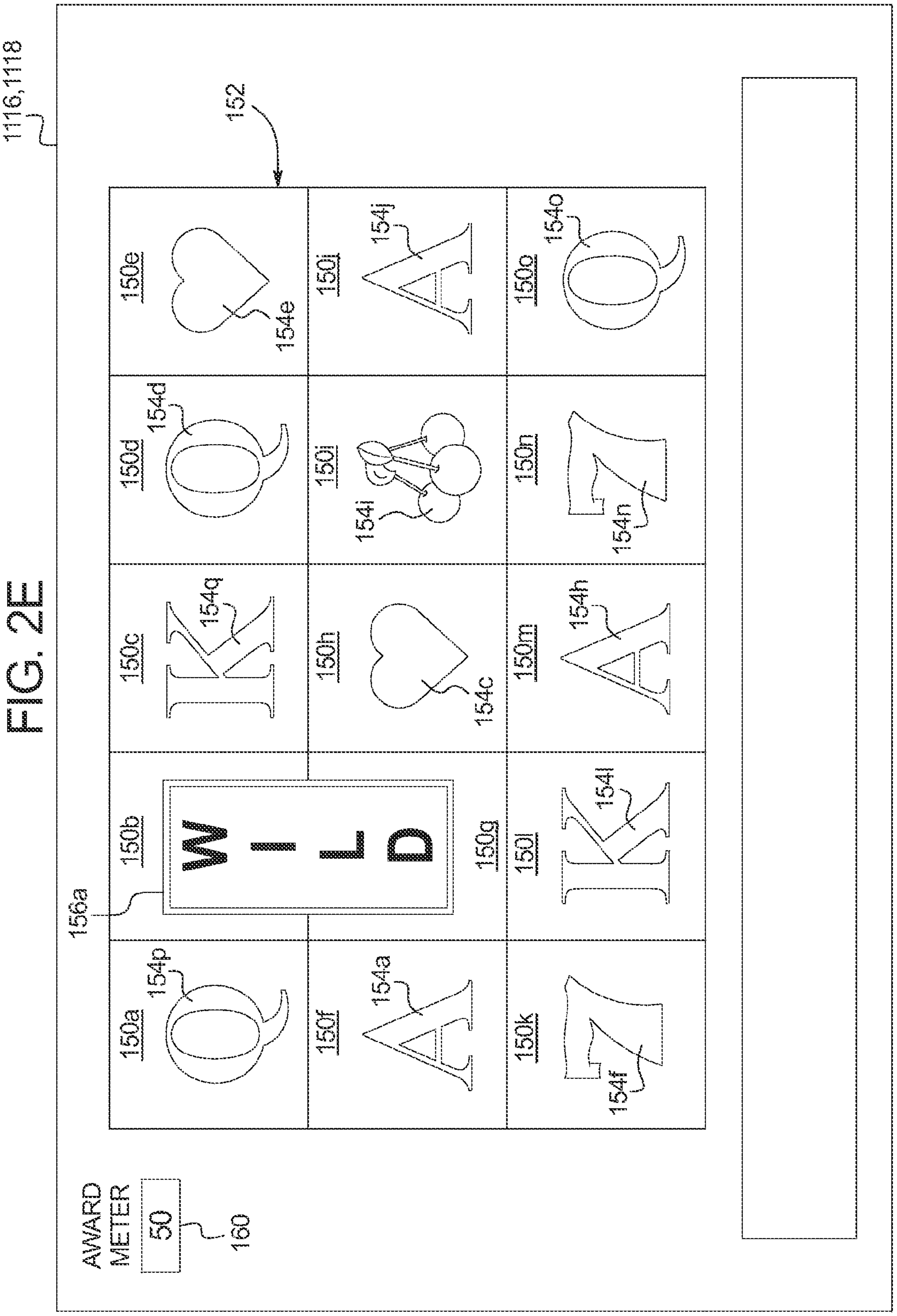

Continuing with the above example, as seen in FIG. 2E, following the shifting of symbols 154*a*, 154*c*, 154*f* and 154*h*, the gaming system generates Queen symbol 154*p* and King symbol 154*q*, and displays these symbols at symbol display positions 150*a*, 150*c*, respectively, of symbol display position matrix 152.

Figure 2F:
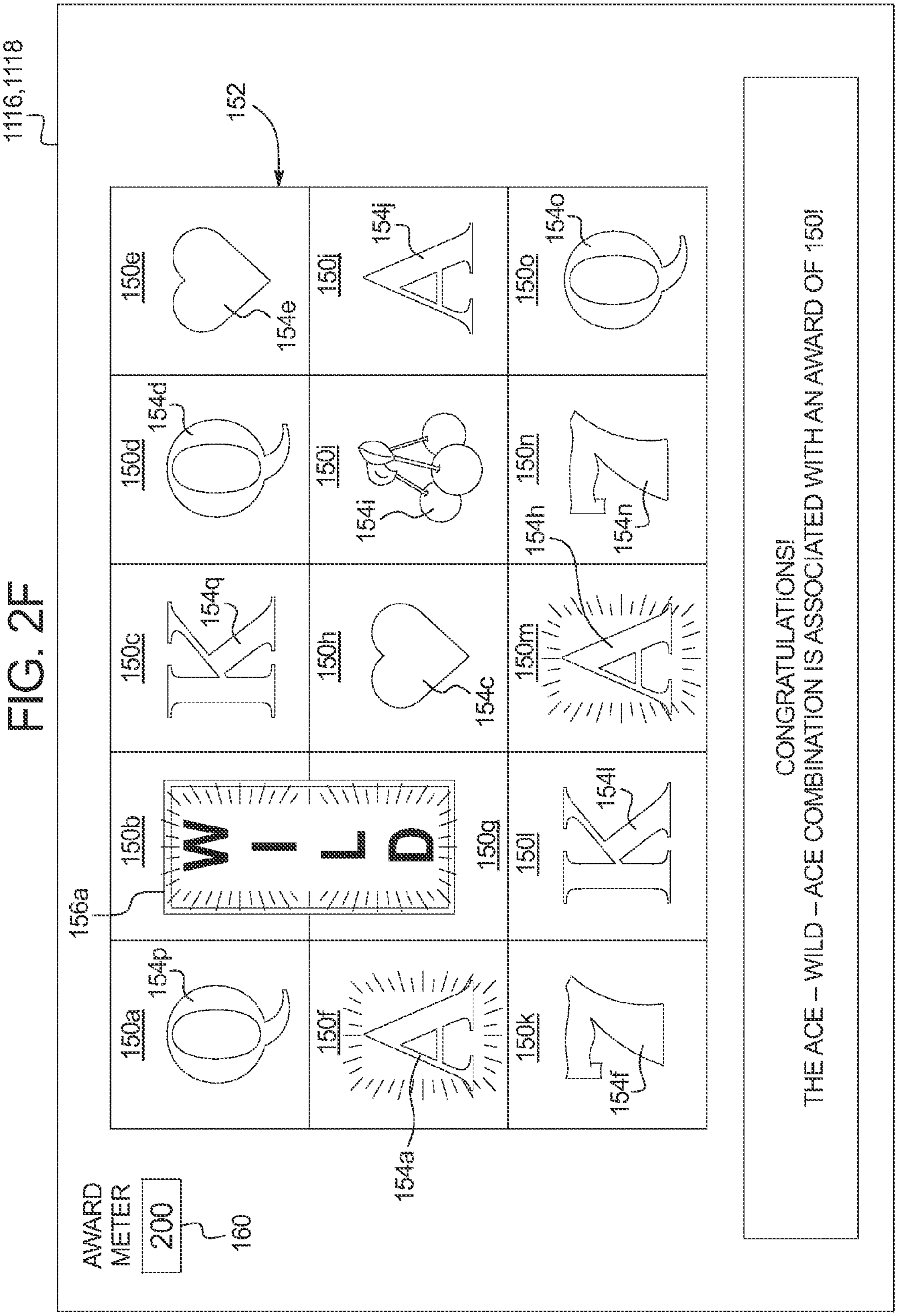

Additionally, as seen in FIG. 2F, the gaming system determines that the symbol combination of Ace symbol 154*a*-wild multiple symbol display position element 156*a*-Ace symbol 154*h* is a winning symbol combination. Accordingly, in this example, the gaming system causes an award of one-hundred-fifty credits to be provided to the player in association with this winning symbol combination (e.g., the gaming system increases the award meter 160 by one-hundred-fifty credits from fifty credits to two-hundred credits). In this example, the gaming system provides appropriate messages such as "CONGRATULATIONS! THE ACE-WILD-ACE COMBINATION IS ASSOCIATED WITH AN AWARD OF 150!" to the player visually, or through suitable audio or audiovisual displays.

Following the generation and display of a symbol in each of the created empty symbol display positions, the gaming system returns to diamond 106 and proceeds with determining whether the displayed symbols (i.e., any non-removed symbols from a previous generation and any subsequently generated and displayed symbols) form any winning symbol combinations.

Figure 2G:
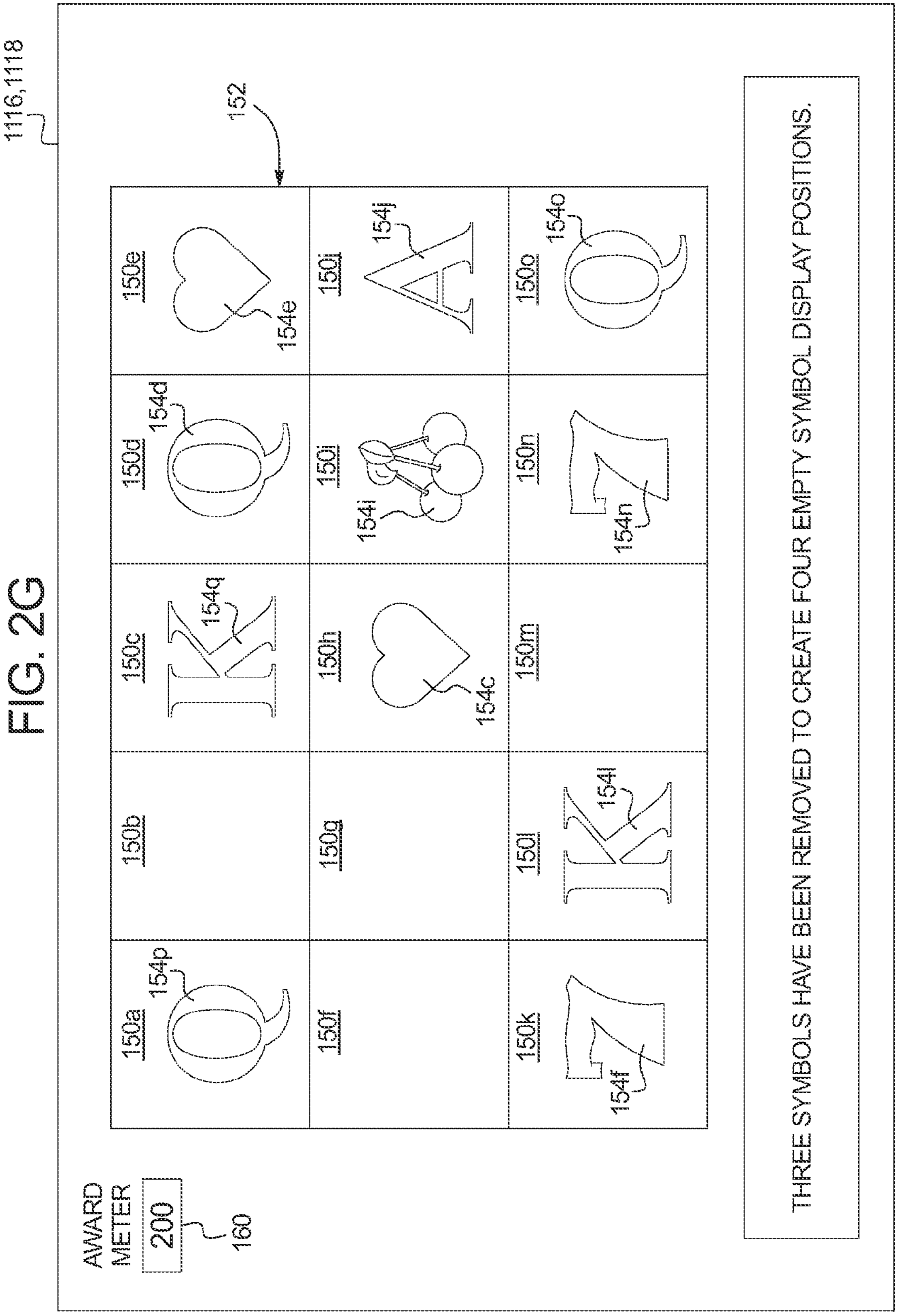

As seen in FIG. 2G, the gaming system removes symbols 154*a* and 154*h* from symbol display positions 150*f* and 150*m*, respectively. This removal creates empty symbol display positions 150*f* and 150*m*. Additionally, the gaming system removes wild multiple symbol display position element 156*a*, creating empty symbol display positions 150*b* and 150*g*. In this example, the gaming system provides appropriate messages such as "THREE SYMBOLS HAVE BEEN REMOVED TO CREATE FOUR EMPTY SYMBOL DISPLAY POSITIONS." to the player visually, or through suitable audio or audiovisual displays.

In an alternative embodiment (not shown), the gaming system removes system 154*a* and 154*h*, but does not remove the wild multiple symbol display position element 156*a*. In another embodiment (not shown), the gaming system removes system 154*a* and 154*h*, but removes the section of the wild multiple symbol display position element 156*a* that is involved in the winning symbol combination. In another embodiment (not shown), the gaming system removes system 154*a* and 154*h*, but does not remove the wild multiple symbol display position element 156*a* until the entire wild multiple symbol display position element is included in a winning symbol combination. In another embodiment (not shown), the gaming system removes system 154*a* and 154*h* and converts the wild multiple symbol display position element 156*a* back to the symbols the multiple symbol display position element 156*a* was upgraded from (e.g., the gaming system converts the multiple symbol display position element 156*a* back to bar symbol 154*b*).

Figure 2H:
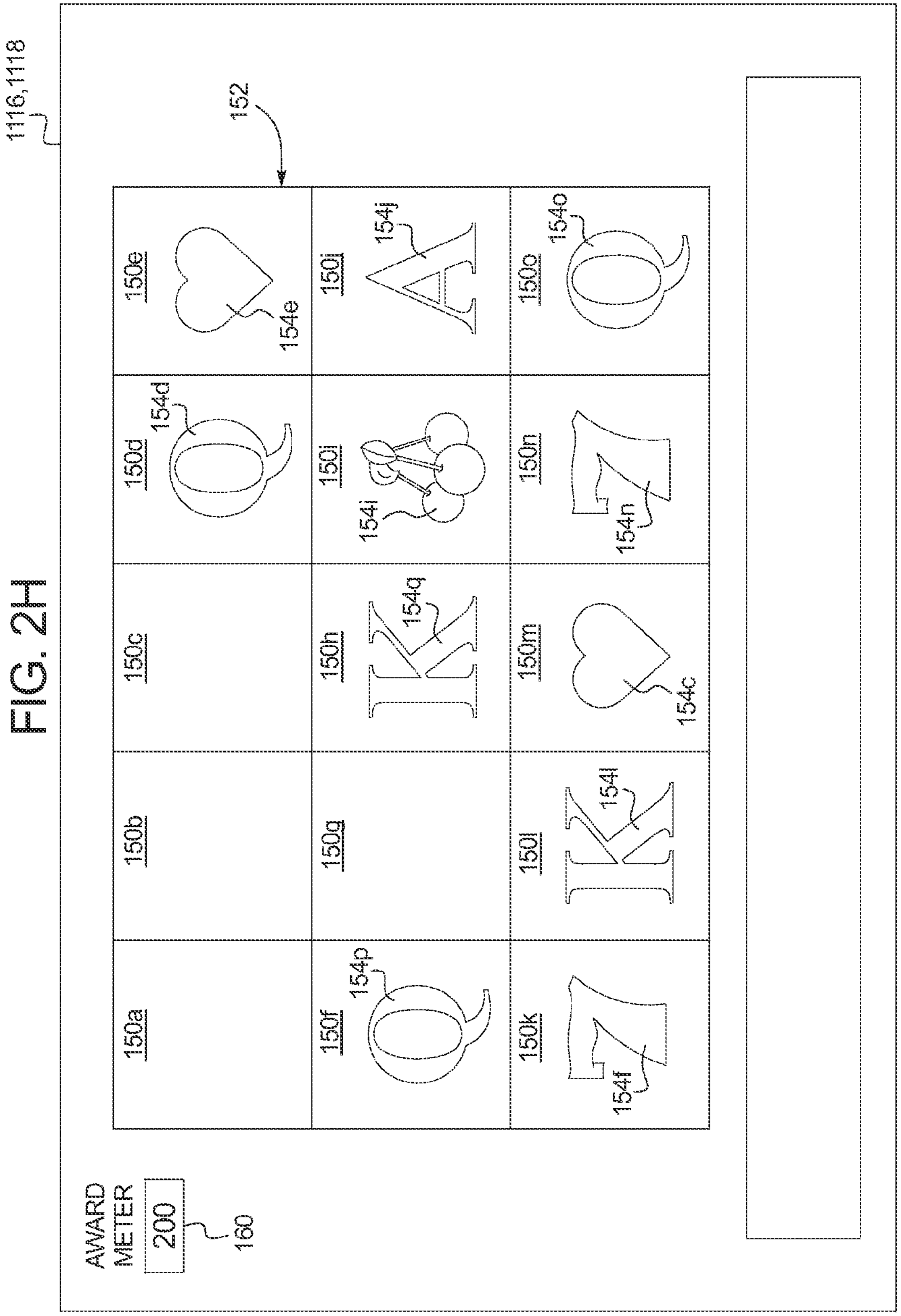

As seen in FIG. 2H, following the removal of any symbols from the plurality of symbol display positions, the gaming system shifts Queen symbol 154*p* from symbol display position 150*a* to symbol display position 150*f*. The gaming system additionally shifts King symbol 154*q* and Heart symbol 154*c* from symbol display positions 150*c* and 150*h*, respectively, to symbol display positions 150*h* and 150*m*, respectively. This shifting creates empty symbol display positions 150*a* and 150*c*.

Figure 2I:
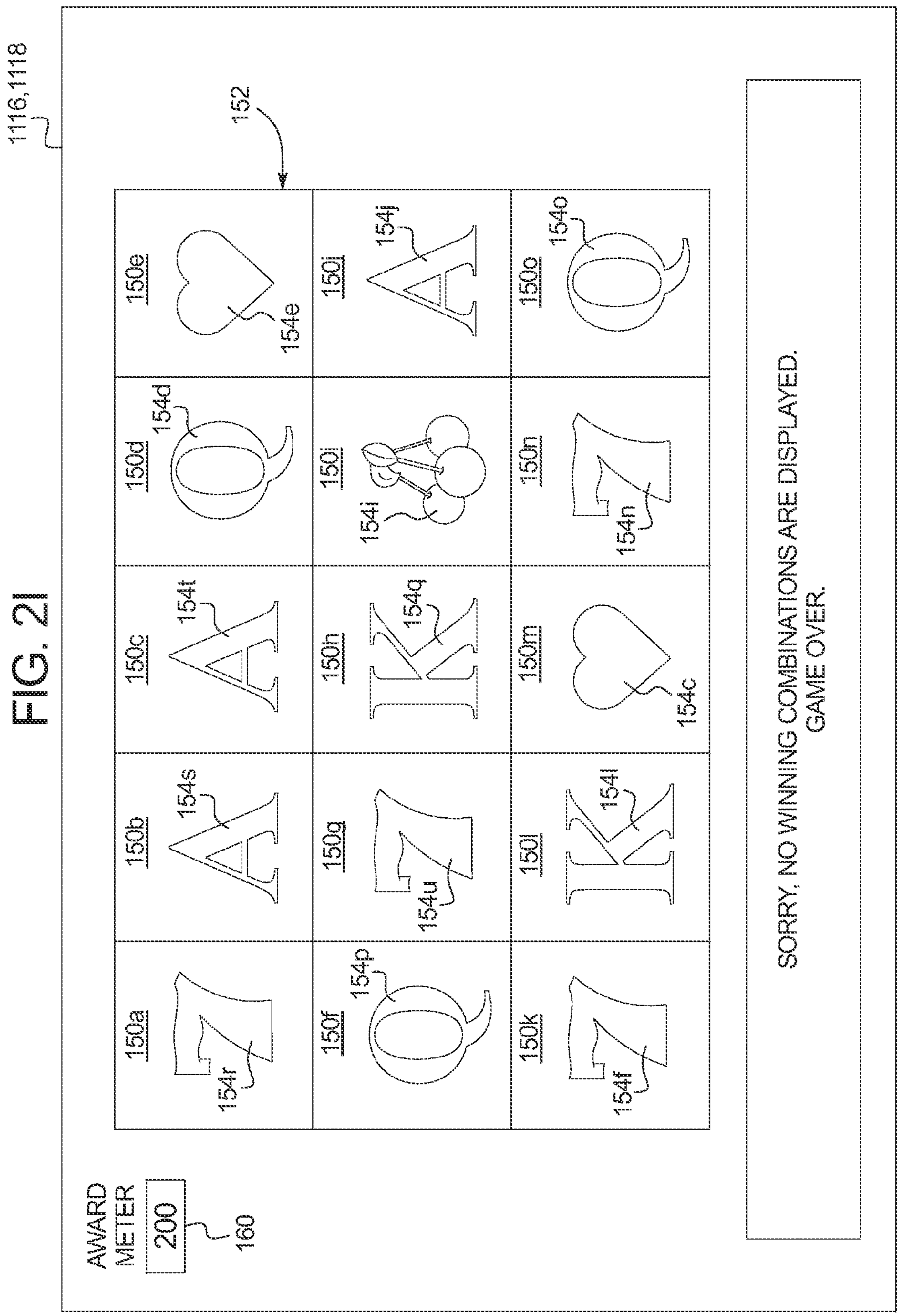

As discussed above, following the removal and/or shifting of any symbols and the determination of whether any upgrade event occurred (in this case, no upgrade event occurred), the gaming system generates and displays, in each of any created empty symbol display positions, a symbol from the plurality of symbols and provides any awards associated with any winning symbol combinations. For example, referring now to FIG. 2I, the gaming system generates Seven symbol 154*r*, Ace symbol 154*s*, Ace symbol 154*t* and Seven symbol 154*u* in symbol display positions 150*a*, 150*b*, 150*c* and 150*g*, respectively. As seen in FIG. 2I, no winning symbol combinations are displayed and the game ends. In this example, the gaming system provides appropriate messages such as "SORRY, NO WINNING COMBINATIONS ARE DISPLAYED. GAME OVER." to the player visually, or through suitable audio or audiovisual displays.

As discussed above, in various embodiments, an upgrade event occurs (i.e., the gaming system triggers an upgrade) based on one or more events which occur in association with one or more plays of one or more games. In one embodiment, an upgrade event occurs based on a symbol (or a designated symbol) shifting from one symbol display position (or designated symbol display position) to another symbol display position (or designated symbol display position). In another embodiment, the gaming system designates one or more symbol display positions. In this embodiment, an upgrade event occurs if a symbol (or designated symbol) displayed at a designated symbol display position shifts to another symbol display position (or designated symbol display position). In another embodiment, an upgrade event occurs if a symbol (or a designated symbol) shifts to a designated symbol display position. In certain embodiments, the gaming system maintains the same designated symbol display positions from game play to game play. In certain other embodiments, the gaming system utilizes different designated symbol display position in different game plays (i.e., the gaming system varies the designated symbol display position from game play to game play).

In certain embodiments associated with an upgrade event occurring if one or more symbols are generated at and/or shifted to a designated symbol display position, the gaming system modifies one or more symbols based on a designated symbol being generated at and/or shifting to a designated symbol display position. For example, a first symbol generated at and/or shifted to a designated symbol display position causes the first symbol to be upgraded to an upgraded first symbol. In one such example, the gaming system displays the upgraded first symbol moving to zero, one or more different symbol display positions wherein the upgraded first symbol interacts with one or more second symbols displayed at the different symbol display positions. In this example, the gaming system determines one or more awards based on such interactions of the upgraded first symbol to the second symbols. In another such example, if the gaming system generates and/or shifts a first symbol to a symbol display position adjacent to the symbol display position of a second symbol, the gaming system determines if the first symbol is an upgraded first symbol. In this example, if the first symbol is not an upgraded first symbol, the gaming system causes a termination event to occur. On the other hand, in this example, if the first symbol is an upgraded first symbol, the gaming system provides an award to the player and/or further upgrades the first symbol (i.e., extends the duration which the first symbol remains an upgraded symbol).

In one embodiment, an upgrade event occurs when a play of a game includes a designated quantity of shifting symbols. In another embodiment, an upgrade event occurs when a symbol (or a designated symbol) is involved in a designated quantity of symbol shifts.

In one embodiment, an upgrade event occurs if one or more symbols (or one or more designated symbols) is/are part of a winning symbol combination. In another embodiment, an upgrade event occurs if one or more symbols (or one or more designated symbols) is/are part of a losing symbol combination. For example, when an Ace symbol, King symbol, Queen symbol, Jack symbol or Ten symbol all appear on a payline, in any order, the gaming system upgrades each of these symbols to a corresponding major symbol. In this embodiment, even if the Ace symbol, King symbol, Queen symbol, Jack symbol or Ten symbol combination is not a winning symbol combination, the upgrade of such symbols to corresponding major symbols (in combination in zero, one or more other displayed major symbols) may be associated with an award.

In another embodiment, if one or more symbols (or designated symbols) in a primary game shift from one symbol display position (or designated symbol display position) to another symbol display position (or designated symbol display position) and a secondary game triggering event does not occur, the gaming system triggers an upgrade event. In another embodiment, if one or more symbols (or designated symbols) in a primary game shift from one symbol display position (or designated symbol display position) to another symbol display position (or designated symbol display position) and a secondary game triggering event occurs, the gaming system triggers an upgrade event. In another embodiment, if one or more symbols (or designated symbols) in a secondary game shift from one symbol display position (or designated symbol display position) to another symbol display position (or designated symbol display position) and a secondary game retriggering event does not occur, the gaming system triggers an upgrade event. In another embodiment, if one or more symbols (or designated symbols) in a secondary game shift from one symbol display position (or designated symbol display position) to another symbol display position (or designated symbol display position) and a secondary game retriggering event occurs, the gaming system triggers an upgrade event.

In another embodiment, one or more of the plurality of symbols each include a secondary symbol, such as a sub-symbol. Each secondary symbol includes zero, one or more elements or characteristics, such as a quantity of points or values. In one embodiment, an upgrade event occurs in association with an individual symbol, individual sub-symbol and/or symbol (or plurality of symbols) associated with a sub-symbol being displayed a designated quantity of times. In another embodiment, an upgrade event occurs in association with an individual symbol, individual sub-symbol and/or symbol (or plurality of symbols) associated with a sub-symbol shifting a designated quantity of times. In one such embodiment, the gaming system utilizes an accumulator (or counter) to track such a quantity. In one alternative embodiment, the gaming system determines whether to modify the individual symbol, individual sub-symbol and/or symbol (or plurality of symbols) associated with a sub-symbol based on the tracked quantity (i.e., modified according to the various embodiments as disclosed herein).

In another embodiment, the gaming system includes a plurality of symbol display position grids wherein at least a first area, column or row of a first symbol display position grid is associated with or linked to at least a first area, column or row of a second symbol display position grid. In these embodiments, an upgrade event occurs when a symbol (or a designated symbol) shifts or transfers from one symbol display position grid (e.g., from a symbol display position of the first area, column or row of the first symbol display position grid) to another symbol display position grid (to a symbol display position of the linked first area, column or row of the second symbol display position grid). It should be appreciated that the gaming system may be configured to trigger one or more upgrades based on one or more suitable events (or combination of events) occurring in association with one or more plays of one or more primary games and/or one or more secondary games.

In various alternative embodiments (as discussed in greater detail below), the gaming system does not provide an apparent reasons to the player for why an upgrade event occurs. In these embodiments, the gaming system's determination to upgrade of one or more attributes or features of one or more plays of one or more games is independent of any event in a primary game or based specifically on any of the plays of any primary game or on any of the plays of any secondary games.

As illustrated above, in one example embodiment, the gaming system terminates the play of the game if no symbols qualify to be removed (and does not proceed to determine if any upgrade event occurs). In another embodiment, regardless of if any symbols qualify to be removed, the gaming system proceeds to determine if any upgrade event occurs. That is, in this alternative embodiment, if no symbols quality to be removed, the gaming system proceeds to diamond 116 (and not block 102) and determines if an upgrade event occurred. For example, if a minor symbol is associated with a major symbol (such that if generated, the gaming system upgrades the minor symbol to a major symbol), five major symbols generated along a payline are associated with an award and the gaming system generated three major symbols along a payline and two minor symbols along the payline. In this example, even if no symbols qualify to be removed (i.e., none of the three major symbols and two minor symbols qualify to be removed), the gaming system upgrades the two minor symbols to major symbols and provides an award for the winning symbol combination of five major symbols (i.e., the three generated major symbols and the two minor symbols upgraded to major symbols).

As discussed above, in various embodiments, upon an occurrence of an upgrade event, such as the shifting or relocation of one or more displayed symbols in the symbol display position matrix, the gaming system upgrades one or more aspects, features or attributes of one or more plays of one or more primary or secondary games.

In certain embodiments, such upgrades pertain to upgrading one or more symbols displayed at one or more symbol display positions of one or more symbol display position matrices. In one such embodiment, the gaming system upgrades a non-wild symbol to a wild symbol such that the wild symbol functions as or otherwise changes to a different symbol. In this embodiment, by upgrading a non-wild symbol to a wild symbol, the gaming system provides a higher probability of obtaining a winning symbol combination (i.e., a wild symbol causes a non-winning symbol combination to become a winning symbol combination). In another such embodiment, the gaming system upgrades a symbol from occupying one symbol display position to occupying a plurality of symbol display positions (or vice versa). In these embodiments, the gaming system provides an increased probability of that modified symbol being part of a winning symbol combination.

For example, referring back to the FIG. 2C and FIG. 2D, an upgrade event occurs in association with the cascading or tumbling of displayed symbols 154*a*, 154*c*, 154*f* and 154*h* from symbol display positions 150*a*, 150*c*, 150*f*, and 150*h*, respectively. In this example, the upgrade event results in previously displayed Bar symbol 154*b* upgrading to a wild multiple symbol display position element 156*a*. In this example, wild multiple symbol display position element 156*a* occupies both symbol display positions 150*b* and 150*g*. By occupying both of these symbol display positions, wild multiple symbol display position element 156*a* in combination with symbol Ace symbol 154*a* and Ace symbol 154*h* form a winning symbol combination. While the multiple symbol display position element in this example occupies vertical adjacent symbol display positions, in various other embodiments, the multiple symbol display position element occupies a plurality of symbol display positions in any direction (e.g., horizontally and/or diagonally and/or across multiple symbol display position matrices as discussed in more detail below).

In one alternative embodiment, in response to an upgrade event, the gaming system modifies a multiple symbol display position element. In one such embodiment, if the multiple symbol display position element occupies a plurality of vertically adjacent symbol display position, the gaming system modifies the multiple symbol display position element such that the multiple symbol display position element occupies a plurality of adjacent symbol display positions in a different direction or relative orientation (such as horizontally, diagonally, or non-linked positions). In one embodiment involving the modification of the multiple symbol display position element, the gaming system removes one or more displayed symbols that are positioned in one or more symbol display positions subsequently occupied by the multiple symbol display position element as a result of the modification. For example, referring to FIG. 2D, if the gaming system modifies multiple symbol display position element 156*a* such that multiple symbol display position element 156*a* occupies symbol display positions 150*g* and 150*h* (as opposed to 150*b* and 150*g*), the gaming system would remove the Heart symbol 154*c* that would otherwise be displayed at symbol display position 150*h*.

In various embodiments, a plurality of upgrade events occur simultaneously, concurrently or overlappingly. For example, if a first and a second upgrade event occur simultaneously, concurrently or overlappingly, the gaming system modifies a displayed symbol to a multiple symbol display position element in association with the first upgrade event and also modifies the multiple symbol display position element orientation in association with the second upgrade event.

In various embodiments, the gaming system includes a plurality of displayed symbols and one or more non-displayed symbols (such as one or more symbols located in a position above a symbol display position in a top row of a symbol display position matrix). In one such embodiment, if an upgrade event occurs, the gaming system modifies one or more of such non-displayed symbols.

In one embodiment, one or more of the plurality of symbols are associated with one or more scatter bonuses. In one such embodiment, if an upgrade event occurs, the gaming system modifies one or more of the scatter bonuses from a first scatter bonus having a first average expected payout to a second, different scatter bonus having a second, different average expected payout (e.g., the scatter bonus is modified from a single scatter bonus to a double scatter bonus or a super scatter bonus).

In various embodiments, the gaming system increments one or more modifiers associated with one or more symbols in association with an upgrade event. In various other embodiments, the gaming system triggers an upgrade in association with an increment of one or more modifiers associated with one or more symbols. In one embodiment, the gaming system associates one or more symbols of the plurality of symbols with a modifier (such as a multiplier). In one embodiment, the associated modifier increments based on a display of the associated symbol (e.g., the modifier increments from 1× to 2× to 3×, etc). In another such embodiment, the modifier is associated with an indicated quantity. In this embodiment, each time the symbol associated with the modifier is generated and/or displayed, the gaming system modifies the incremented quantity. If the modified quantity is greater than a designated quantity, the gaming system increments the associated modifier as discussed above.

In another embodiment, the gaming system upgrades a symbol to a split symbol including a plurality of symbols occupying a single symbol display position in association with an upgrade triggering event. In another embodiment, the gaming system triggers an upgrade in association with a plurality of symbols occupying a single display position. In these embodiments, the gaming system provides an increased probability that a winning symbol combination is formed in association with the plurality of symbols occupying that single symbol display position. In various embodiments, the gaming system upgrades any symbol to any other symbol (or symbol associated with a modifier to another symbol associated with the modifier) and additionally or alternatively upgrades any symbol type to any other symbol type (or symbol type associated with a modifier to another symbol type associated with the modifier)

In certain embodiments, in addition to or alternative to upgrading one or more symbols, the gaming system upgrades one or more award evaluations of one or more symbols displayed at one or more symbol display positions of one or more symbol display position matrices. In one such embodiment, if an upgrade event occurs, the gaming system activates (or otherwise adds) one or more paylines and provides any awards associated with any designated winning symbol combinations displayed along any additionally activated paylines. That is, in addition to any awards provided in association with any winning symbol combinations displayed along any previously active paylines, the gaming system evaluates and provides awards in association with any winning symbol combinations displayed along any additionally activated paylines.

Figure 3A:
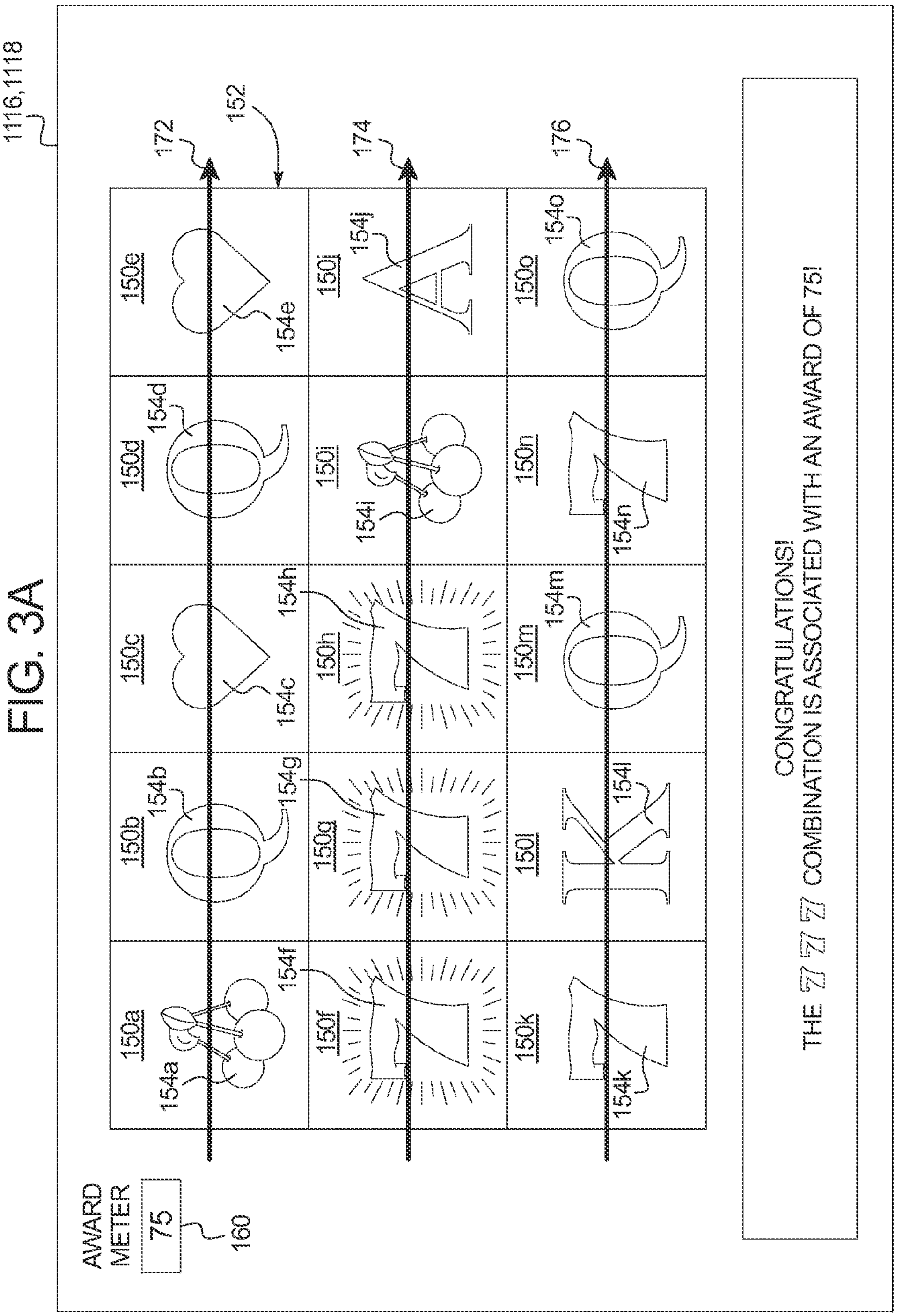
FIGS. 3A, 3B, 3C and 3D are front views of one example embodiment of the gaming system disclosed herein illustrating a play of a cascading symbol game which employs one or more award evaluation upgrades.

For example, referring now to FIG. 3A, following the generation of a plurality of symbols 154 at a plurality of symbol display positions 150 of a symbol display position matrix 152, the gaming system evaluates the symbols displayed along active paylines 172, 174 and 176. Upon determining that the Seven symbol 154*f*, Seven symbol 154*g* and Seven symbol 154*h* displayed at symbol display positions 150*f*, 150*g*, and 150*h*, respectively, along active payline 174 form a winning symbol combination, the gaming system causes an award of seventy-five credits to be provided to the player in association with this winning symbol combination (e.g., the gaming system increases the award meter 160 from zero credits to seventy-five credits). In this example, the gaming system provides appropriate messages such as "CONGRATULATIONS! THE 7-7-7 COMBINATION IS ASSOCIATED WITH AN AWARD OF 75!" to the player visually, or through suitable audio or audiovisual displays.

Figure 3B:
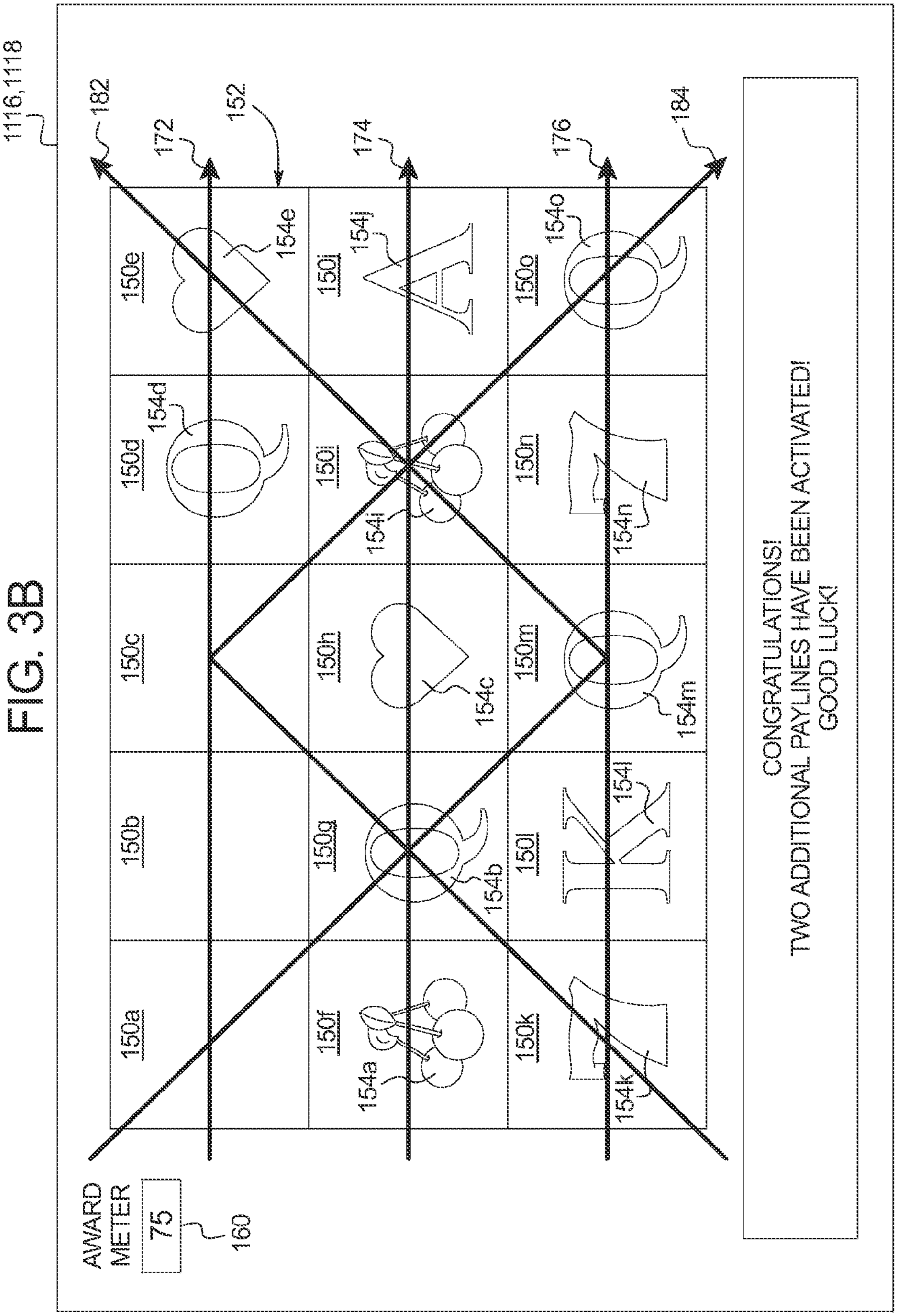

As discussed above, following the removal of one or more displayed symbols from one or more symbol display positions and the display of another symbol in zero, one or more of any created empty symbol display positions by shifting zero, one or more of the remaining displayed symbols into zero, one or more empty symbol display positions, the gaming system determines if any upgrade event occurs. Referring now to FIG. 3B, following the creation of empty symbol display positions 150*f*, 150*g* and 150*h* and the shifting of Cherry symbol 154*a*, Queen symbol 154*b* and Heart symbol 154*c* from symbol display positions 150*a*, 150*b* and 150*c*, respectively, to empty symbol display positions 150*f*, 150*g* and 150*h*, respectively, the gaming system determines that an upgrade event occurs and activates additional paylines 182 and 184. In this example, the gaming system provides appropriate messages such as "CONGRATULATIONS! TWO ADDITIONAL PAYLINES HAVE BEEN ACTIVATED!" to the player visually, or through suitable audio or audiovisual displays.

Figure 3C:
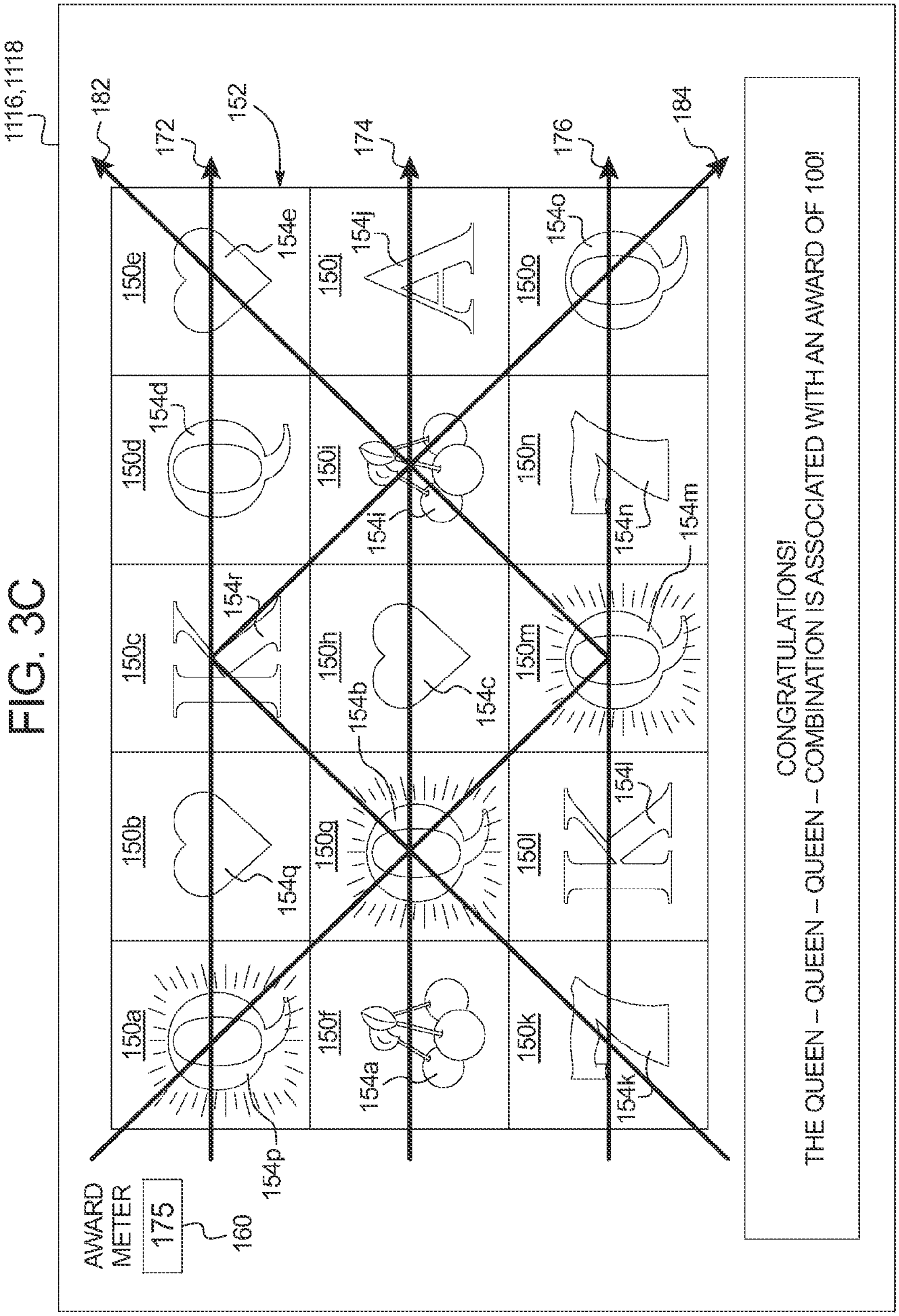

As discussed above, following the determination of whether any upgrade event occurred, the gaming system generates, in each of any created empty symbol display positions, a symbol from the plurality of symbols and evaluates the symbols displayed along the active paylines to determine if any winning symbol combinations are displayed. For example, referring now to FIG. 3C, the gaming system determines whether any winning symbol combinations are displayed along any of active paylines 172, 174, 176, 182 and 184. That is, in addition to evaluating the symbols displayed along previously active paylines, 172, 174 and 176, the gaming system additionally evaluates the symbols displayed along additionally activated paylines 182 and 184.

In this illustrated example, the gaming system determines that the Queen symbol 154*p*. Queen symbol 154*b* and Queen symbol 154*m* displayed at symbol display positions 150*a*, 150*g* and 150*m* along active payline 182 form a winning symbol combination. The gaming system provides an award of one-hundred credits in association with this Queen symbol 154*p*-Queen symbol 154*b*-Queen symbol 154*m* winning symbol combination (e.g., the gaming system increases the award meter 160 from seventy-five credits to one-hundred-seventy-five credits). In this example, the gaming system provides appropriate messages such as "CONGRATULATIONS! THE QUEEN-QUEEN-QUEEN COMBINATION IS ASSOCIATED WITH AN AWARD OF 100!" to the player visually, or through suitable audio or audiovisual displays.

Figure 3D:
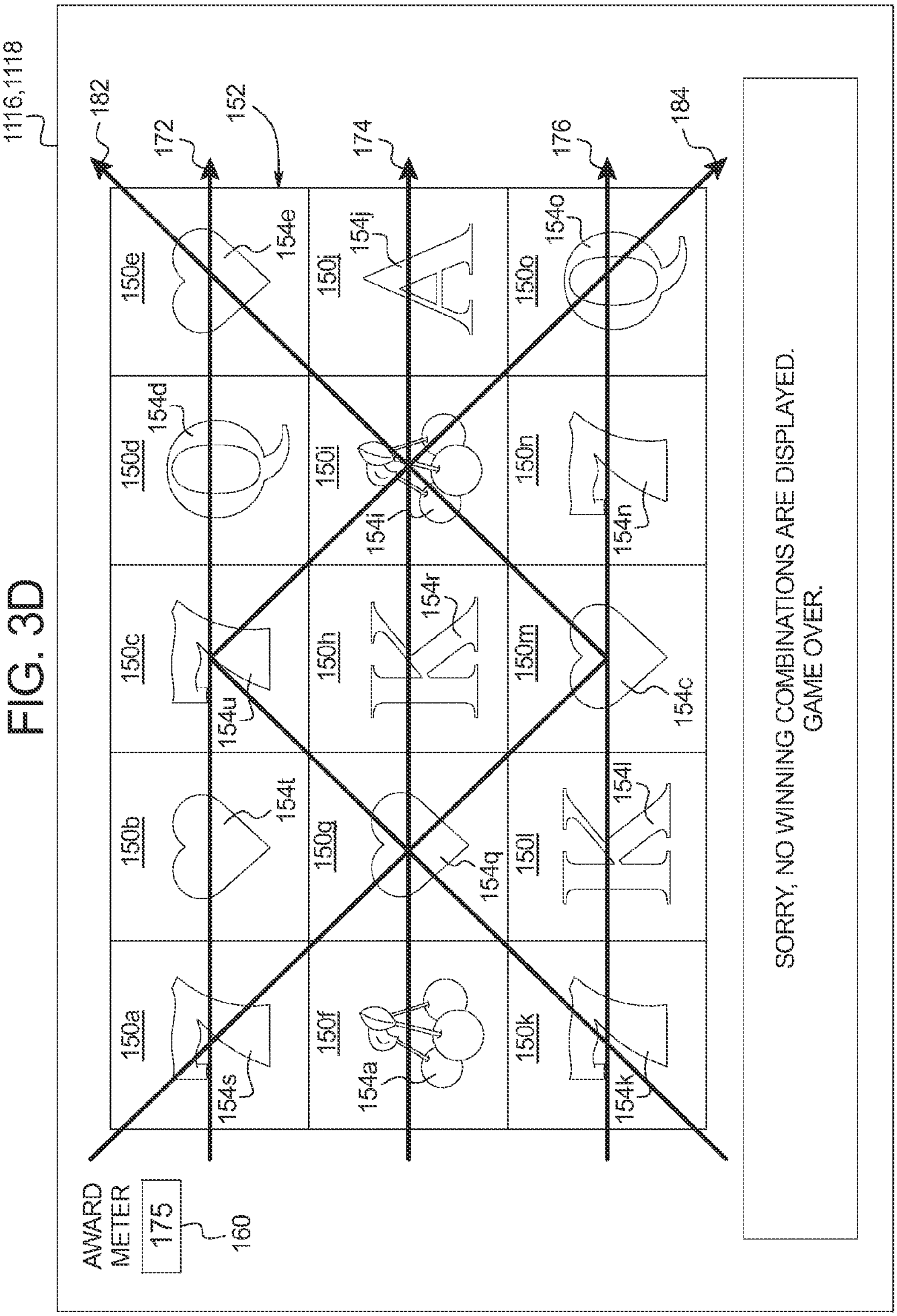

Referring now to FIG. 3D, in association with Queen symbol 154*p*-Queen symbol 154*b*-Queen symbol 154*m* winning symbol combination displayed along active payline 182, the gaming system removed Queen symbol 154*p*, Queen symbol 154*b* and Queen symbol 154*m* displayed at symbol display positions 150*a*, 150*g* and 150*m*, respectively. Additionally, the gaming system shifted: (1) Heart symbol 154*q* from symbol display position 150*b* to symbol display position 150*g*, and (2) King symbol 154*r* and Heart symbol 154*c* from symbol display positions 150*c* and 150*h*, respectively, to symbol display positions 150*h* and 150*m*, respectively. The gaming system additionally generated Seven symbol 154*s*. Ace symbol 154*t* and Seven symbol 154*u* in empty symbol display positions 150*a*, 150*b* and 150*c*, respectively. However, as seen in FIG. 3D, no winning symbol combinations are displayed along any of active paylines 172, 174, 176, 182 or 184. Accordingly, the game ends. In this example, the gaming system provides appropriate messages such as "SORRY, NO WINNING COMBINATIONS ARE DISPLAYED. GAME OVER." to the player visually, or through suitable audio or audiovisual displays.

In the above illustrated example of FIGS. 3A to 3D, by causing an upgrade event to occur in association with a play of a game, the gaming system provides increased award opportunities. Specifically, with reference to FIG. 3C, by activating additional payline 182, the player receives an award associated with a winning symbol combination displayed along activated payline 182 that would not have otherwise been provided.

In one alternative embodiment, if an upgrade event occurs, the gaming system provides a plurality of different evaluations of the symbols displayed along one or more paylines (i.e., 2 way pays). For example, for a first payline, the gaming system provides: (1) a first evaluation along the first payline from left to right, and (2) a second, different evaluation along the first payline from right to left.

In another embodiment, if an upgrade event occurs, the gaming system adds one or more additional ways to win and subsequently determines whether to provide any awards based on the added ways to win (e.g., the gaming system determines if any symbols form any strings of symbols associated with any awards). In another embodiment, if an upgrade event occurs, the gaming system adds one or more additional symbol display positions to the symbol display position matrix (or matrices). In this embodiment, the gaming system then generates, displays and evaluates the symbols in any added symbol display positions in combination with zero, one or more previously generated symbols and provides any associated awards. That is, in addition to generating, displaying and evaluating the symbols displayed at the symbol display positions of the symbol display position matrix (or matrices) and providing any associated awards, the gaming system generates, displays and evaluates one or more additional symbols in one or more added symbol display positions (in combination with the previously generated and displayed symbols) and provides any awards associated with any winning symbol combinations (or stings of symbol combinations).

In another embodiment, if an upgrade event occurs, the gaming system triggers one or more secondary games (such as one or more bonus games). It should be appreciated that the gaming system provides such upgraded award evaluations (discussed above) in association with a current game (or evaluation), a subsequent game (or evaluation), and/or a plurality of subsequent games (or evaluations).

In certain other embodiments, such upgrades additionally or alternatively pertain to upgrading one or more attributes or features of one or more bonus or secondary games which are subsequently triggered. In one such embodiment, if an upgrade event occurs, the gaming system increases an amount of a modifier associated with a triggered secondary game. In another such embodiment, the gaming system upgrades the play of any subsequently triggered secondary game by modifying the quantity or type of attributes or features associated with the triggered secondary game. In another such embodiment, the gaming system upgrades the play of any subsequently triggered secondary game by increasing one or more positive attributes or features (e.g., increasing a quantity of picks, increasing a quantity of free spins, and/or increasing an amount of modifier) associated with the subsequently triggered secondary game. In another such embodiment, the gaming system upgrades the play of any subsequently triggered secondary game by decreasing one or more negative attributes or features (e.g., decreasing a quantity of terminator symbols, removing one or more lower valued award) associated with the subsequently triggered secondary game. In another such embodiment, the gaming system upgrades the play of any subsequently triggered secondary game by modifying the average expected payout and/or the volatility of the subsequently triggered secondary game.

As discussed above, in certain embodiments, if an upgrade event occurs, the gaming system modifies one or more attributes or features of one or more subsequently triggered secondary or bonus games. In different embodiments, the gaming system selects such attribute(s) or feature(s) from the group of features including, but not limited to:

i. a book-end wild symbols feature;
ii. a stacked wild symbols feature;
iii. an expanding wild symbols feature;
iv. a wild reel feature;
v. a retrigger symbol feature;
vi. an anti-terminator symbol feature;
vii, a locking reel feature;
viii. a locking symbol display position feature;
ix. a modification of a paytable utilized for a play of a game;
x. an application of a modifier, such as a multiplier or an additional quantity of credits, to one or more awards of a paytable utilized for a play of a game;
xi. a modification of an average expected payback percentage of a play of a game;
xii. a modification of an average expected payout of a play of a game;
xiii. a modification of one or more awards available;
xiv. a modification of a range of awards available;
xv. a modification of a type of awards available;
xvi. a modification of one or more progressive awards;
xvii. a modification of which progressive awards are available to be won;
xviii. a modification of one or more modifiers, such as multipliers, available;
xix. a modification of an activation of a reel (or a designated reel);
xx. a modification of an activation of a plurality of reels;
xxi. a modification of a generated outcome (or a designated generated outcome);
xxii. a modification of a generated outcome (or a designated generated outcome) associated with an award over a designated value;
xxiii. a modification of a generated outcome (or a designated generated outcome) on a designated payline;
xxiv. a modification of a generated outcome (or a designated generated outcome) in a scatter configuration;
xxv. a modification of a winning way to win (or a designated winning way to win);
xxvi a modification of a designated symbol or symbol combination;
xxvii. a modification of a generation of a designated symbol or symbol combination on a designated payline;
xxviii. a quantity of paylines to activate;
xxix. which paylines to activate;
xxx. a quantity of ways to win;
xxxi. which ways to win;
xxxii. a modification of a generation of a designated symbol or symbol combination in a scatter configuration;
xxxiii. a modification of an activation of a secondary or bonus display (such as an award generator);
xxxiv. a modification of a quantity of activations of a secondary or bonus display (e.g., a modification of a quantity of spins of an award generator);
xxxv. a modification of a quantity of sections of a secondary or bonus display (e.g., a modification of a quantity of sections of an award generator);
xxxvi. a modification of one or more awards of a secondary or bonus display;
xxxvii. a modification of an activation of a community award generator;
xxxviii. a modification of a quantity of activations of a community award generator;
xxxix. a modification of a quantity of sections of a community award generator;
xl. a modification of one or more awards of a community award generator;
xli. a modification of a quantity of picks in a selection game;
xlii. a modification of a quantity of offers in an offer and acceptance game;
xliii. a modification of a quantity of moves in a trail game;
xliv. a modification of an amount of free spins provided;
xlv. a modification of a game terminating or ending condition;
xlvi. a modification of how one or more aspects of one or more games (e.g., colors, speeds, sound) are displayed to a player; and
xlvii. a modification of any game play feature associated with any play of any game disclosed herein.

In certain embodiments, the gaming system selects a secondary or bonus game to play from the group of secondary games including, but not limited to:

i. a play of any suitable slot game;
ii. a play of any suitable free spins or free game activations;
iii. a play of any suitable wheel game;
iv. a play of any suitable card game;
v. a play of any suitable offer and acceptance game;
vi. a play of any suitable award ladder game;
vii. a play of any suitable puzzle-type game;
viii. a play of any suitable persistence game;
ix. a play of any suitable selection game;
x. a play of any suitable cascading symbols game;
xi. a play of any suitable ways to win game;
xii. a play of any suitable scatter pay game;
xiii. a play of any suitable coin-pusher game;
xiv. a play of any suitable elimination game;
xv. a play of any suitable stacked wilds game;
xvi. a play of any suitable trail game;
xvii. a play of any suitable bingo game;
xviii. a play of any suitable video scratch-off game;
xix. a play of any suitable pick-until-complete game;
xx. a play of any suitable shooting simulation game;
xxi. a play of any suitable racing game;
xxii. a play of any suitable promotional game;
xxiii. a play of any suitable high-low game;
xxiv. a play of any suitable lottery game;
xxv. a play of any suitable number selection game;
xxvi. a play of any suitable dice game;
xxvii. a play of any suitable skill game;
xxviii. a play of any suitable auction game;
xxix. a play of any suitable reverse-auction game;
xxx. a play of any suitable group game;
xxxi. a play of any suitable game in a service window;
xxxii. a play of any suitable game on a mobile device; and/or
xxxiii. a play of any other suitable type of game.

As discussed above, the gaming system includes a plurality of symbols (and/or designated symbols). In various embodiments, if an upgrade triggering event occurs, the gaming system employs the utilization of one or more symbols which include a length component and a width component, such as a two dimensional tile with a symbol displayed on the face of the tile. In another embodiment, an upgrade triggering event occurs based on a display of one or more of such symbols.

In various embodiments, if an upgrade triggering event occurs, the gaming system employs the utilization of one or more multiple dimension symbols. In various other embodiments, an upgrade triggering event occurs based on a display of one or more multiple dimension symbols. These multiple dimension symbols include a length component, a width component and a depth component. For example, one or more multiple dimension symbols each include a six-sided or hexagonal shape with individually displayed symbols on each side or face of the multi-dimensional shape. In another example, one or more multiple dimension symbols each include a four-sided square or rectangular shape with individually displayed symbols on each side or face. In another example, one or more multiple dimension symbols each include a three-sided or triangular shape with individually displayed symbols on each side or face. In one alternative embodiment, one or more faces or sides of one or more multiple dimension symbols does not include an individually displayed symbol. That is, while certain faces or sides of a multiple dimension symbol include a symbol, certain other faces or sides of the multiple dimension symbol do not include any symbol. It should be appreciated that such multiple dimension symbols can include any suitable number of sides and any suitable number of individually displayed symbols per side.

In another alternative embodiment, one or more of the plurality of symbols (and/or designated symbols) are associated with a positive outcome and one or more of the plurality of symbols are associated with a negative outcome (e.g., a terminator symbol). In different embodiments, an upgrade triggering event and/or an upgrade of one or more attributes or features of one or more plays of one or more games occurs based on a generated quantity and type of symbols associated with positive outcomes compared to the quantity and type of symbols associated with negative outcomes (in association with one or more plays of one or more games). In another embodiment, if an upgrade triggering event occurs, the gaming system employs the utilization of one or more symbols associated with a positive and/or negative outcome.

In various alternative embodiments, for each generation, removal and/or shifting associated with a symbol of the plurality of symbols, the gaming system accumulates one or more modifiers, such as multipliers, for the player. In different embodiments, for each generation, removal and/or shifting associated with that modifier symbol, the gaming system modifies a value of that modifier symbol. In one such embodiment, an upgrade triggering event and/or an upgrade of one or more attributes or features of one or more plays of one or more games occurs based on an accumulation of such modifiers. In another embodiment, if an upgrade triggering event occurs, the gaming system employs the utilization of one or more of such modifier symbols.

In one embodiment, one or more of the symbols are wild modifier symbols, such as wild multipliers. In another embodiment, one or more of the symbols are wild symbols. In certain embodiments, the gaming system associates one or more of a plurality of wild symbols (or wild modifier symbols) with a quantity, wherein the gaming system determines whether to utilize and/or remove such wild symbols (or wild modifier symbols) based on an associated quantity reaching a designated value (e.g., zero). In different embodiments, for each generation, removal and/or shifting associated with that wild modifier symbol, the gaming system modifies a value of that wild modifier symbol. In various embodiments, an upgrade triggering event and/or an upgrade of one or more attributes or features of one or more plays of one or more games occurs based on such wild symbols and/or wild modifier symbols. In various other embodiments, if an upgrade triggering event occurs, the gaming system employs the utilization of such wild symbols and/or wild modifier symbols.

In various other alternative embodiments, the gaming system associates one or more symbols of the plurality of symbols with an award (such as a value), a modifier (such as a multiplier) and/or a quantity of free spins. In one embodiment, if an upgrade triggering event occurs, the gaming system employs the utilization of one or more of such symbols. In another embodiment, an upgrade triggering event and/or an upgrade of one or more attributes or features of one or more plays of one or more games occurs based on the awards, modifiers and/or free spins associated with the displayed symbols. For example, an upgrade triggering event and/or an upgrade of one or more attributes or features of one or more plays of one or more games occurs if such awards, modifiers and/or free spins reach a designated amount. In another such embodiment, the gaming system provides an award to a player based on the awards associated with the displayed symbols included in a winning symbol combination. In another such embodiment, if a secondary game triggering event occurs, the gaming system triggers a play of a secondary game wherein one or more features of the secondary game are based on the awards associated with the displayed symbols.

As indicated above, in various embodiments, the gaming system determines whether any of the plurality of symbols displayed at the plurality of symbol display positions of the symbol display position matrix qualify to be removed. While the examples discussed above include the removal of one or more symbols associated with a winning symbol combination (i.e., in association with one or more events which occur in a play of a primary game and/or secondary game), in certain embodiments, the gaming system removes one or more display symbols from the symbol display position matrix independent from any event which occurs in association with any play of any primary game and/or secondary game.

In certain embodiments, the gaming system designates one or more symbol removal qualification conditions and determines whether to remove a symbol according to such symbol removal qualification conditions. In certain embodiments, a symbol removal qualification is satisfied based on: (i) one or more events which occur in association with the play of one or more primary games and/or secondary games, or (ii) one or more events which occur independent from any event which occurs in association with a play of one or more primary games and/or secondary games.

In one embodiment, the gaming system utilizes the fourth dimension of time to determine which upgrade to employ in association with one or more plays of one or more games, whether an upgrade triggering event occurs and/or whether to remove a displayed symbol (or displayed designated symbol) from the symbol display position matrix. In one such embodiment, an upgrade triggering event occurs if an amount of time (such as an amount of elapsed time or accumulated time) reaches a designated amount. In another embodiment, the gaming system determines one or more upgrades to employ in association with one or more plays of one or more games based on an amount of elapsed time. In another such embodiment, the gaming system associates one or more of the plurality of symbols with a duration and determines whether to remove those symbols from a symbol display position matrix based on the associated duration. For example, in one embodiment, the gaming system determines which upgrade to employ, triggers an upgrade event and/or removes a displayed symbol from a symbol display position matrix based on an associated duration reaching a designated value (e.g., zero). In another embodiment, the gaming system prevents any upgrade triggering event, any upgrade of one or more attributes or features of one or more plays of one or more games and/or any removal of a symbol from the symbol display position matrix based on an associated duration being different from a designated value.

In one embodiment, if an upgrade triggering event occurs, the gaming system employs the utilization of one or more symbol removal qualifications. In one embodiment, the gaming system determines whether to remove a displayed symbol from the symbol display position matrix based on any associated symbol removal qualification conditions. In one embodiment, an upgrade triggering event occurs in association with the satisfaction of one or more symbol removal qualifications. In one embodiment, if a first removal qualification condition is satisfied in association with a symbol (e.g., the symbol forms part of a winning symbol combination), then as long as a second removal qualification condition is not also satisfied (e.g., the associated duration has not expired or otherwise reached a designated value), the displayed symbol is not removed from the symbol display position of the symbol display position matrix. That is, in certain embodiments, the removal of a symbol from a symbol display position matrix is based on a plurality of associated symbol removal qualification conditions.

In one embodiment, if an upgrade triggering event occurs, the gaming system employs the utilization of one or more symbols having an indicated quantity. For example, one or more of the plurality of symbols includes a numeral indicated in parentheses next to that symbol. In this embodiment, each time a symbol removal qualification is satisfied in association with a symbol (or designated symbol), the indicated quantity of that symbol is modified (e.g., incremented). In one embodiment, if the modified quantity is greater than a designated quantity, that symbol is removed from the symbol display position matrix. In another embodiment, if the modified quantity is less than a designated quantity, that symbol is removed from the symbol display position matrix. In another embodiment, if the modified quantity is different from a designated quantity, that symbol is removed from the symbol display position matrix. In various embodiments, an upgrade triggering event occurs in association with the modified quantity of one or more symbols reaching the designated quantity, being different from the designated quantity, being greater than the designated quantity or being less than the designated quantity. It should be appreciated that the utilization of indicated quantities of such symbols operates similar to the utilization of the wild symbols useable for a designated quantity of symbol generations as described in U.S. Published Patent Application No. 2010/0022297.

In various alternative embodiments, if an upgrade triggering event occurs, the gaming system enables a player to designate one or more of the displayed symbols to hold. The gaming system then removes zero, one or more non-held displayed symbols. In other words, in this embodiment, if an upgrade triggering event occurs, the gaming system enables a player to designate one or more symbols such that the gaming system does not remove any displayed symbol held by the player. In another embodiment, an upgrade triggering event occurs in association with a player electing to hold one or more designated symbols, or one or more symbols displayed at one or more designated symbol display positions. In one alternative embodiment, the gaming system implements these features based on the placement of a wager, such as a side wager or a maximum wager.

In another embodiment including one or more player inputs, if an upgrade triggering event occurs, the gaming system enables a player to designate one or more symbols such that the gaming system removes any player designated symbols. In other words, if an upgrade triggering event occurs, the gaming system enables a player to designate one or more symbols such that the gaming system removes more or more of the displayed symbol designated by the player. In certain embodiments, the gaming system enables a player to discard one or more symbols wherein one or more non-discarded symbols are held at one or more symbol display positions within the symbol display position matrix. In another embodiment, an upgrade triggering event occurs in association with a player electing to discard (or remove) one or more designated symbols, or one or more symbols displayed at one or more designated symbol display positions. In one alternative embodiment, the gaming system implements these features based on the placement of a wager, such as a side wager or a maximum wager.

In various embodiments, certain upgrade triggering events supersede certain other upgrade triggering events and/or certain upgrades of one or more attributes or features of one or more plays of one or more games supersede certain other upgrades of one or more attributes or features of one or more plays of one or more games. In these embodiments, the gaming system determines which triggers occur and which upgrades to provide accordingly.

As discussed above, in various embodiments, the gaming system displays symbols in zero, one or more of the created empty symbol display positions of the symbol display position matrix by shifting zero, one or more of the remaining displayed symbols into the zero, one or more created empty symbol display positions. In various embodiments, the gaming system shifts one or more non-displayed symbols into the zero, one or more created empty symbol display positions. That is, in addition to generating a plurality of symbols and displaying that plurality of symbols, the gaming system additionally and/or alternatively generates one or more symbols which are not displayed. In certain embodiments, one or more non-displayed symbols are linked to (or otherwise have a position relative to) one or more displayed symbols. For example, the gaming system generates (but does not display) a symbol and associates that symbol with a symbol display position (which is not displayed) above a symbol display position of a symbol display position matrix. In various embodiments, an upgrade triggering event occurs in association with a generation of one or more non-displayed symbols. In another embodiment, if an upgrade triggering event occurs, the gaming system employs the utilization of one or more non-displayed symbols in association with one or more plays of one or more games.

In one embodiment, if an upgrade triggering event occurs, the gaming system upgrades one or more non-displayed symbols. For example, if a non-displayed symbol is a non-wild symbol and an upgrade event occurs, the gaming system upgrades the non-displayed non-wild symbol to a non-displayed wild symbol. Accordingly, if the non-displayed wild symbol subsequently shifts positions such that it is subsequently displayed at one of the plurality of symbol display positions of one or more symbol display position matrices, the gaming system (in association with an evaluation) evaluates the wild symbol in association with one or more other displayed symbols.

In one embodiment, the gaming system shifts an applicable displayed (or non-displayed) symbol to a desired empty symbol display position one symbol display position at a time. That is, the gaming system shifts an applicable displayed (or non-displayed) symbol one symbol display position at a time regardless of the number of empty symbol display positions separating the applicable displayed symbol from the desired empty symbol display position. By shifting an applicable displayed (or non-displayed) symbol to a desired empty symbol display position one symbol display position at a time, the gaming system provides additional award evaluation opportunities.

In another embodiment, the gaming system shifts an applicable displayed (or non-displayed) symbol to a desired empty symbol display position as many symbol display positions at a time as possible in a designated direction (i.e., upward, downward, sideways, diagonally, or any other suitable direction). For example, if three symbol display positions (such as two empty symbol display positions) separate an applicable displayed symbol from a desired empty symbol display position, the gaming system shifts the applicable displayed (or non-displayed) symbol two symbol display positions such that the applicable displayed symbol fills the desired empty symbol display position. It should be appreciated that the gaming system is configured to shift applicable displayed (or non-displayed) symbols any number of symbol display positions as so desired.

In one embodiment, the gaming system maintains the position of each shifted symbol relative to one or more other displayed symbols or coordinates during any shift (or relocation). For instance, the gaming system in one embodiment moves each symbol displayed at a symbol display position adjacently above an empty symbol display position of a column of a symbol display position matrix (displayed as a reel) downward as far as possible to occupy one or more empty symbol display positions while maintaining the relative order and/or relative position of the symbols of that column of the symbol display position matrix from top to bottom. For example, as seen in the transition from FIG. 2C to FIG. 2D, the gaming system maintains the position of Seven symbol 154*f* relative to Ace symbol 154*a* when shifting these symbols from symbol display positions 150*a* and 150*f*, respectfully, to symbol display positions 150*f* and 150*k*, respectively. It should be appreciated the gaming system may shift symbols such that the relative position of one symbol relative to another symbol is not maintained.

In certain embodiments, shifting non-removed displayed symbols does not result in a different quantity of empty symbol display positions. Rather, shifting non-removed displayed symbols to different symbol display positions results in a same quantity of different empty symbol display positions. For example, removing two displayed symbols creates two empty symbol display positions. In this example, after a subsequent shifting of one or more displayed symbols into the plurality of empty symbol display positions, two empty symbol display positions remain.

While the above discussed examples include shifting (or relocating) symbols within a common symbol display position matrix, in various alternative embodiments, the gaming system shifts (or otherwise relocates) displayed symbols in a plurality of different symbol display position matrices.

In these alternative embodiments, the gaming system utilizes a plurality of different symbol display position matrices. In one such embodiment, at least a first area, column or row of a first symbol display position matrix is associated with or linked to at least a first area, column or row of a second symbol display position matrix and at least a second area, column or row of the first symbol display position matrix is not associated with or linked to any area, column or row in the second symbol display position matrix. In a play of the game, as described above, symbols are generated and displayed at each symbol display position of each symbol display position matrix. Additionally, the displayed symbols of the first symbol display position matrix are evaluated independent from the displayed symbols of the second symbol display position matrix (and vice versa) to provide any awards for any winning symbols or winning symbol combinations. After the evaluation, the gaming system removes zero, one, or more symbols of zero one or more of the plurality of position matrices to leave zero, one, or more empty symbol display positions (in accordance with the embodiments discussed above). In one embodiment, if any empty symbol display positions are formed in the first area, column or row of the first symbol display position matrix, the gaming system shifts or transfers one or more symbols from the first area, column or row of the second symbol display position matrix to the linked first area, column or row of the first symbol display position matrix to occupy the one or more empty symbol display positions. That is, a displayed symbol tumbles, cascades, shifts, falls, etc from the second symbol display position matrix to the first symbol display position matrix. On the other hand, in this embodiment, if there are any empty symbol display positions in the second area, column or row of the first symbol display position matrix, the gaming system does not shift or transfer any symbols (or designated symbols) from any area, column or row of the second symbol display position matrix to any symbol display positions of the first symbol display position matrix. In one embodiment, an upgrade triggering event occurs in association with a symbol displayed in a symbol display position of a first symbol display position matrix tumbling or cascading to a symbol display position associated with a second, different symbol display position matrix.

While the embodiments discussed above generally include one or more displayed symbols tumbling, cascading, falling or shifting in a downward direction, in various other embodiments, the gaming system utilizes different directions of movement in association with tumbling, cascading, falling or shifting symbols. For example, the gaming system causes an initial shifting of one or more symbols in a downward direction and a subsequent shift of one or more symbols in a sideways direction. In various embodiments, the gaming system shifts one or more symbols in a plurality of different directions. For example, the gaming system shifts a displayed symbol (or designated symbol) downward and then sideways to a desired empty symbol display position.

In various embodiments, the gaming system utilizes a plurality of multiple sided game elements. In certain embodiments, if an upgrade triggering event occurs, the gaming system employs the utilization of one or more of these multiple sided game elements. For example, upon the occurrence of an upgrade event, the gaming system activates one or more multiple sided game elements. In another embodiment, an upgrade event occurs in association with the display and/or shifting of one or more multiple sided game elements.

In one embodiment, each multiple sided game element includes a separate or distinct symbol displayed on each of one or more sides or faces of that multiple sided game element. In certain embodiments, as the gaming system displays such multiple sided game elements at different symbol display positions, the gaming system differs or modifies which sides of which multiple sided game elements are displayed to the player (and thus differs or modifies which separate or distinct symbols of which sides or faces of the multiple sided game elements are displayed to the player). In one embodiment, a transition from the display of a first side of a multiple sided game element to the display of a second, different side of the multiple sided game element causes an upgrade event to occur. In another embodiment, if a multiple sided game element does not transition from displaying a first side to displaying a second, different side, an upgrade event occurs. In another embodiment, a transition from the display of a first side of a multiple sided game element to the display of a second, different side of the multiple sided game element in association with a shift of the multiple sided game element from a first symbol display position to a second different symbol display position causes an upgrade event to occur. In another embodiment, if a multiple sided game element shifts from a first symbol display position to a second, different symbol display position and a transition from displaying a first side to displaying a second, different side does not occur, an upgrade event occurs. In another embodiment, if a multiple sided game element shifts from a first symbol display position to a second, different symbol display position and a transition from displaying a first side to displaying a second, different side results in a similar symbol being displayed (i.e., the first side and the second side include a similar symbol), an upgrade event occurs.

In different embodiments, in association with: (i) an initial generation of one or more multiple sided game elements, (ii) a shifting of one or more previously generated multiple sided game elements (following the removal of one or more displayed symbols) and/or (iii) a subsequent generation of one or more multiple sided game elements (following any shifting of any previously displayed symbols), the gaming system alternates which symbol on which side or face of one or more multiple sided game elements is displayed to the player. In these embodiments, in conjunction with the generation of one or more symbols and/or the shifting of one or more previously displayed symbols, the gaming system rotates such multiple sided game elements to display the different distinct symbols on the different sides of such multiple sided game elements.

Put differently, in one embodiment, as a multiple sided game element cascades or tumbles from at least a first symbol display position to at least a second symbol display position, the gaming system flips or rotates the multiple sided game element such that the symbol on a first side of the multiple sided game element is displayed to the player in association with the first symbol display position and the symbol on a second, different side of the multiple sided game element is displayed to the player in association with the second symbol display position. For example, if a column of a symbol display position matrix includes three symbol display positions, for a first multiple sided game element generated in association with that column, the gaming system displays: (i) a symbol of a first side of that multiple sided game element when that multiple sided game element is positioned in a first or top symbol display position of the column, (ii) a symbol of a second side of that multiple sided game element when that multiple sided game element is positioned in a second or middle symbol display position of the column (i.e., the multiple sided game element flipped to display another side), and (iii) the symbol of the first side of that multiple sided game element when that multiple sided game element is positioned in a third or bottom symbol display position of the column (i.e., the multiple sided game element flipped again).

In various embodiments, if an upgrade triggering event occurs, the gaming system employs the utilization of one or more multiple dimension game elements (i.e., a three dimensional shape with individually displayed symbols on each side or face of the three dimensional shape). For example, upon the occurrence of an upgrade event, the gaming system activates one or more multiple dimension game elements. In various other embodiments, an upgrade triggering event occurs in association with a display and/or shifting of one or more of these multiple dimension game elements.

In one embodiment, an upgrade triggering event occurs in association with a multiple dimension game element cascading or tumbling from at least a first symbol display position to at least a second symbol display position. In one such embodiment, an upgrade event occurs if the multiple dimension game element flips or rotates such that the symbol on one of: (i) a first side of the multiple dimension game element, (ii) a second side of the multiple dimension game element, or (iii) a third side of the multiple dimension game element, is displayed to the player in association with the first symbol display position and the symbol on another one of: (i) the first side of the multiple dimension game element, (ii) the second side of the multiple dimension game element, or (iii) the third side of the multiple dimension game element, is displayed to the player in association with the second symbol display position. In one embodiment, the multiple dimension game element flips or rotates in association with each cascade or tumble. In another embodiment, the multiple dimension game element does not flip or rotate in association with each cascade or tumble (i.e., the multiple dimension game element may or may not flip or rotate). For example, the gaming system determines whether or not the multiple dimension game element flips or rotates in association with a given cascade or tumble (i.e., for each cascade or tumble, the gaming system determines whether or not the multiple dimension game element flips or rotates. In one embodiment, an upgrade triggering event occurs if a multiple dimension game element does not flip or rotate in association with a cascade or tumble from a first symbol display position (or designated symbol display position) to a second symbol display position (or designated symbol display position).

In one embodiment, the gaming system causes at least one display device of at least one electronic gaming machine to display the cascading (or tumbling) symbol game. In another embodiment, in addition or in alternative to each electronic gaming machine displaying the cascading symbol game, the gaming system causes one or more community or overhead display devices to display part or all of the cascading symbol game to one or more other players or bystanders either at a gaming establishment or viewing over a network, such as the internet. In another embodiment, in addition or in alternative to each electronic gaming machine displaying the cascading symbol game, the gaming system causes one or more internet sites to each display the cascading symbol game such that a player is enabled to log on from a personal web browser. In another such embodiment, the gaming system enables a player to play one or more games on one device while viewing the cascading symbol game from another device, such as a desktop or laptop computer.

In various embodiments, the symbol display positions form a plurality of symbol display position matrices or grids. In certain embodiments, an upgrade triggering event occurs based on one or more events (or interactions) which occur in association with the plurality of symbol display position matrices. In certain other embodiments, an upgrade triggering event causes the activation of, and/or one or more modifications to, the plurality of symbol display position matrices. In one embodiment, each symbol display position matrix includes a plurality of symbol display positions arranged in a plurality of rows and a plurality of columns. Additionally, in this embodiment, each symbol display position matrix also has a different depth. Thus, each symbol display position of each symbol display position matrix is associated with a specific row, a specific column and a specific depth. Moreover, in each symbol display position matrix of this embodiment, one or more symbol display positions are aligned with or otherwise correspond to one or more symbol display positions of one or more symbol display position matrices of different depths. That is, one or more symbol display position matrices are positioned (relative to the player's line of sight) behind one or more other symbol display position matrices and thus one or more symbol display positions of one or more symbol display position matrices are positioned (relative to the players line of sight) behind one or more symbol display positions of one or more other symbol display position matrices. In one embodiment which utilizes a plurality of symbol display position matrices (according to the above discussed orientation of matrices relative to other matrices), the creation of one or more empty symbol display positions at one symbol display position matrix causes an upgrade triggering event to occur and/or the exposure of symbols generated at symbol display positions of another matrix positioned at another depth. In another embodiment, if an upgrade triggering event occurs, the gaming system removes one or more symbols from one or more symbol display positions to expose one or more symbols generated at one or more symbol display positions of another matrix positioned at another depth.

In certain embodiments which include a plurality of symbol display position matrices and a plurality of multiple dimension game elements, one or more paylines of any suitable direction extend through a plurality of symbol display positions and/or one or more symbols displayed on one or more faces of one or more multiple dimension game elements of a symbol display position matrix, at one depth. In another embodiment, one or more paylines of any suitable direction extend through a plurality of symbol display positions and/or one or more symbols displayed on one or more faces of one or more multiple dimension game elements of a plurality of symbol display position matrices, at a plurality of different depths. In these embodiments, the gaming system determines whether the symbols generated along such paylines form any winning symbol combinations. In another embodiment, one or more ways to win are associated with a plurality of symbol display positions and/or one or more symbols displayed on one or more faces of one or more multiple dimension game elements of one or more symbol display position matrices, at one depth. In another embodiment, one or more ways to win are associated with a plurality of symbol display positions, and/or one or more symbols displayed on one or more faces of one or more multiple dimension game elements of a plurality of symbol display position matrices, at a plurality of different depths. In these embodiments, the gaming system determines whether the symbols generated in a quantity of active symbol display positions form any winning symbol combinations.

In one embodiment which utilizes a plurality of symbol display position matrices, when determining if any awards are associated with any displayed symbols, the gaming system evaluates symbols displayed at a plurality of symbol display positions of a plurality of symbol display position matrices, at a plurality of different depths. That is, since the gaming system evaluates the symbols that are currently displayed to the player and different symbols positioned at different depths may be currently displayed to the player (due to the removal and/or shifting of symbols positioned in front of these symbols), the gaming system evaluates symbols displayed at different depths to determine any additional awards to provide to the player. In various embodiments, the gaming system provides that symbols shift (i.e., tumble, cascade, etc) from one symbol display position to another. In certain embodiments, such a symbol display position shift results in a symbol shifting from a symbol display position at a first depth to a symbol display position at a second, different depth. In one embodiment an upgrade triggering event occurs based on a symbol shifting from a symbol display position at a first depth to a symbol display position at a second, different depth. In another embodiment, if an upgrade triggering event occurs, the gaming system causes one or more symbols to shift from one or more symbol display positions at a first depth to one or more symbol display positions at one or more different depths. Such a configuration provides the player with additional opportunities to win awards in association with a plurality of matrices of symbol display positions.

In different embodiments, the awards associated with one or more symbols or winning symbol combinations include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product such as a free teddy bear, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

It should be appreciated that any of the embodiments disclosed herein may be implemented in a non-tumbling reels configuration. In one such embodiment, the gaming system does not remove and/or shift any symbols, but proceeds with determining if any upgrade event occurs. In another such embodiment, the gaming system removes zero, one or more symbols but after such removal of zero, one or more generated symbols, the gaming system does not shift zero, one or more symbols to fill zero, one or more empty symbol displays. In this embodiment, the gaming system generates zero, one or more symbols in any created empty symbol display positions and proceeds with determining if any upgrade event occurs.

In one embodiment, as described above, a cascading symbol game is a primary or base wagering game. In this embodiment, upon a placement of a wager by a player, the gaming system triggers a play of the cascading symbol game.

In another embodiment, the cascading symbol game is a secondary or bonus game which is triggered in response to an occurrence of a cascading symbol game triggering event. In certain embodiments, a cascading symbol game triggering event, an upgrade triggering event and/or which upgrade is selected occurs based on an outcome associated with one or more plays of any primary game, an award associated with one or more plays of any primary game, an outcome associated with one or more plays of any secondary game and/or an award associated with one or more plays of any secondary game. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a cascading symbol game triggering event, an upgrade triggering event and/or which upgrade is selected to occur.

In another embodiment (as discussed above), the gaming system does not provide any apparent reasons to the players for a cascading symbol game triggering event, an upgrade triggering event and/or which upgrade is selected to occur. In these embodiments, such determinations are not triggered by an event in a primary game or based specifically on any of the plays of any primary game or on any of the plays of any secondary game of the gaming devices in the system. That is, these events occur without any explanation to the player or alternatively with simple explanations to the player.

In one such embodiment, a cascading symbol game triggering event, an upgrade triggering event and/or which upgrade is selected occurs based on an amount of coin-in. In this embodiment, the gaming system determines if an amount of coin-in wagered reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a cascading symbol game triggering event, an upgrade triggering event and/or which upgrade is selected occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a cascading symbol game triggering event, an upgrade triggering event and/or which upgrade is selected occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a cascading symbol game triggering event, an upgrade triggering event and/or which upgrade is selected occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another such alternative embodiment, a cascading symbol game triggering event, an upgrade triggering event and/or which upgrade is selected occurs based on a predefined variable reaching a defined parameter threshold. For example, when the 500,000$^{th}$ player has played a gaming device of the gaming system (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another such alternative embodiment, a cascading symbol game triggering event, an upgrade triggering event and/or which upgrade is selected occurs based on a quantity of games played. In this embodiment, a quantity of games played is set for when one or more of such events or conditions will occur. In one embodiment, such a set quantity of games played is based on historic data.

In another alternative embodiment, a cascading symbol game triggering event, an upgrade triggering event and/or which upgrade is selected occurs based on time. In this embodiment, a time is set for when one or more of such events or conditions will occur. In one embodiment, such a set time is based on historic data.

In another such alternative embodiment, a cascading symbol game triggering event, an upgrade triggering event and/or which upgrade is selected occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another such alternative embodiment, a cascading symbol game triggering event, an upgrade triggering event and/or which upgrade is selected occurs based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another such alternative embodiment, a cascading symbol game triggering event, an upgrade triggering event and/or which upgrade is selected occurs based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a cascading symbol game triggering event, an upgrade triggering event and/or which upgrade is to select may be implemented in accordance with the gaming system and method disclosed herein.

It should be appreciated that any of the above-described cascading symbol game triggering events, upgrade triggering events and/or which upgrades are selected may be combined in one or more different embodiments.

Alternative Embodiments

It should be appreciated that in different embodiments, one or more of:

i. a shape or configuration of each symbol display position grid;

ii. a quantity of rows in each symbol display position grid;

iii. a quantity of columns in each symbol display position grid;

iv. a quantity of symbols generated;

v. which symbols are shifted;

vi. which symbols retain their original positioning;

vii. a determination of if one or more symbols will be removed;

viii. which symbol combinations are winning symbol combinations;

ix. which awards are associated with which winning symbol combinations;

x. which symbols are removed from which symbol display position grids;

xi. a quantity of symbol display position grids;

xii. a quantity of symbol display positions in each symbol display position grid;

xiii. a quantity of symbols removed from any symbol display position grids;

xiv. the direction of any shifting of any symbols;

xv. which position one or more symbols are shifted to;

xvi. a quantity of positions one or more symbols are shifted;

xvii. which symbols are available to be generated in each symbol display position grid;

xviii. a duration of time a symbol will remain at one of the symbol display positions;

xix. a quantity of winning symbols combinations which a symbol will remain at one of the symbol display positions;

xx. a quantity of symbol shifts a symbol will remain at one of the symbol display positions;

xxi. a quantity of games played in which a symbol will remain at one of the symbol display positions;

xxii. a determination of whether to enable a player to make any inputs to hold any symbols;

xxiii. a determination of whether to enable a player to make any inputs to discard any symbols;

xxiv. whether to evaluate any symbols or plurality of symbols to determine any winning outcomes;

xxv. a quantity of evaluations associated with each shift of any symbols;

xxvi. what type of upgrade to associate with an occurrence of an upgrade event;

xxvii. whether to upgrade a symbol to another symbol;

xxviii. whether to upgrade a symbol type to another symbol type;

xxix. which wild category is selected;

xxx. whether to cause a multiple dimensional symbol to flip;

xxxi. a quantity of times to flip a multiple dimensional symbol;

xxxii. which side of a multiple dimensional symbol is selected in association with a shift (or cascade or tumble);

xxxiii. whether or not to an upgrade event occurs in association with a play of a game (i.e., a primary game or a secondary game);

xxxiv. a quantity of upgrades provided;

xxxv. a quantity of subsequent games for which an upgraded evaluation persists; and/or xxxvi. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (RDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 6A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 4A:
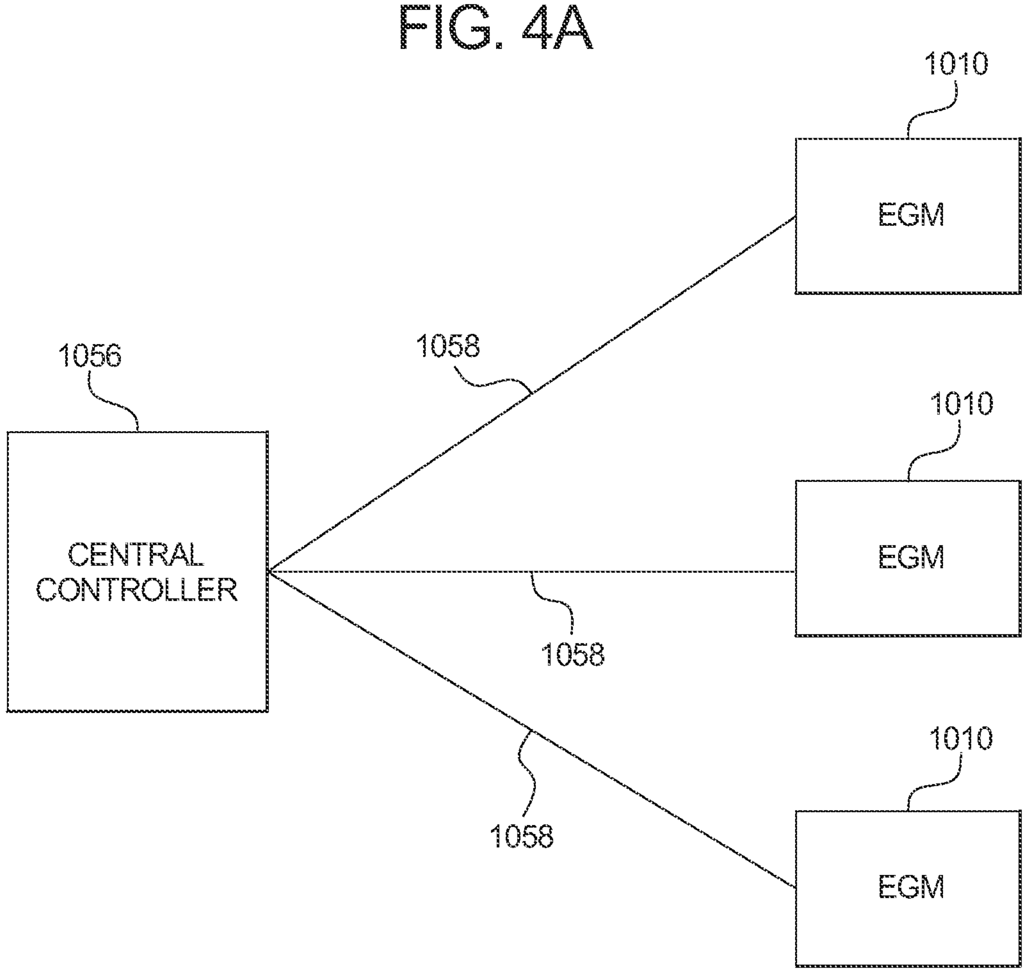
FIG. 4A is a schematic block diagram of one embodiment of a network configuration of the gaming system disclosed herein.
Figure 4B:
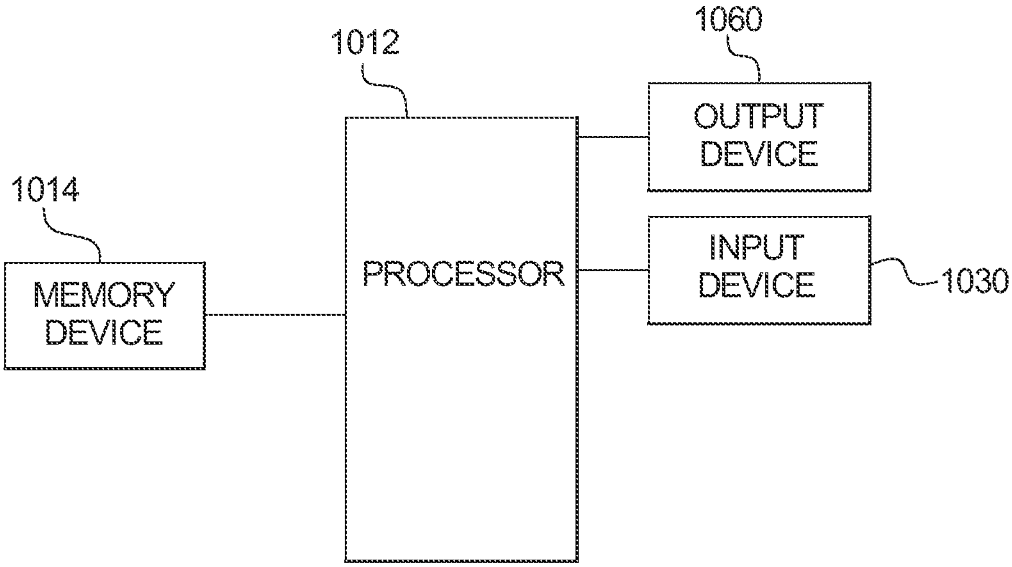
FIG. 4B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 4B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 4B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

In various embodiments, the EGM includes one or more input devices. The input devices may include any suitable device that enables an input signal to be produced and received by the at least one processor of the EGM. The example EGM illustrated in FIG. 4B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 7A and 7B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 7A and 7B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 7A and 7B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 7A and 7B each include a card reader 1138. The card reader is configured to read a player identification card inserted into the card reader.

Figure 5A:
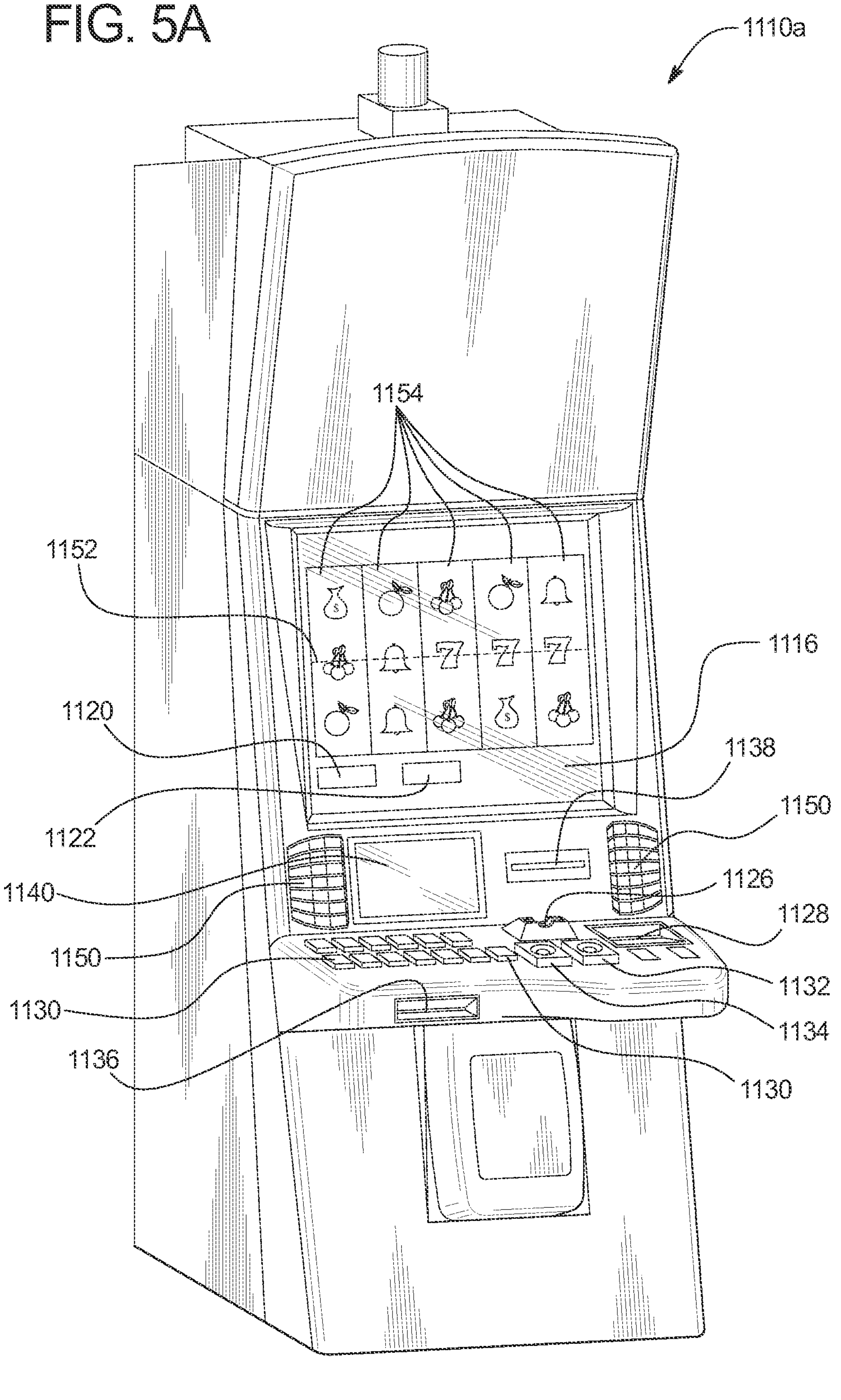
FIGS. 5A and 5B are perspective views of example alternative embodiments of the gaming system disclosed herein.
Figure 5B:
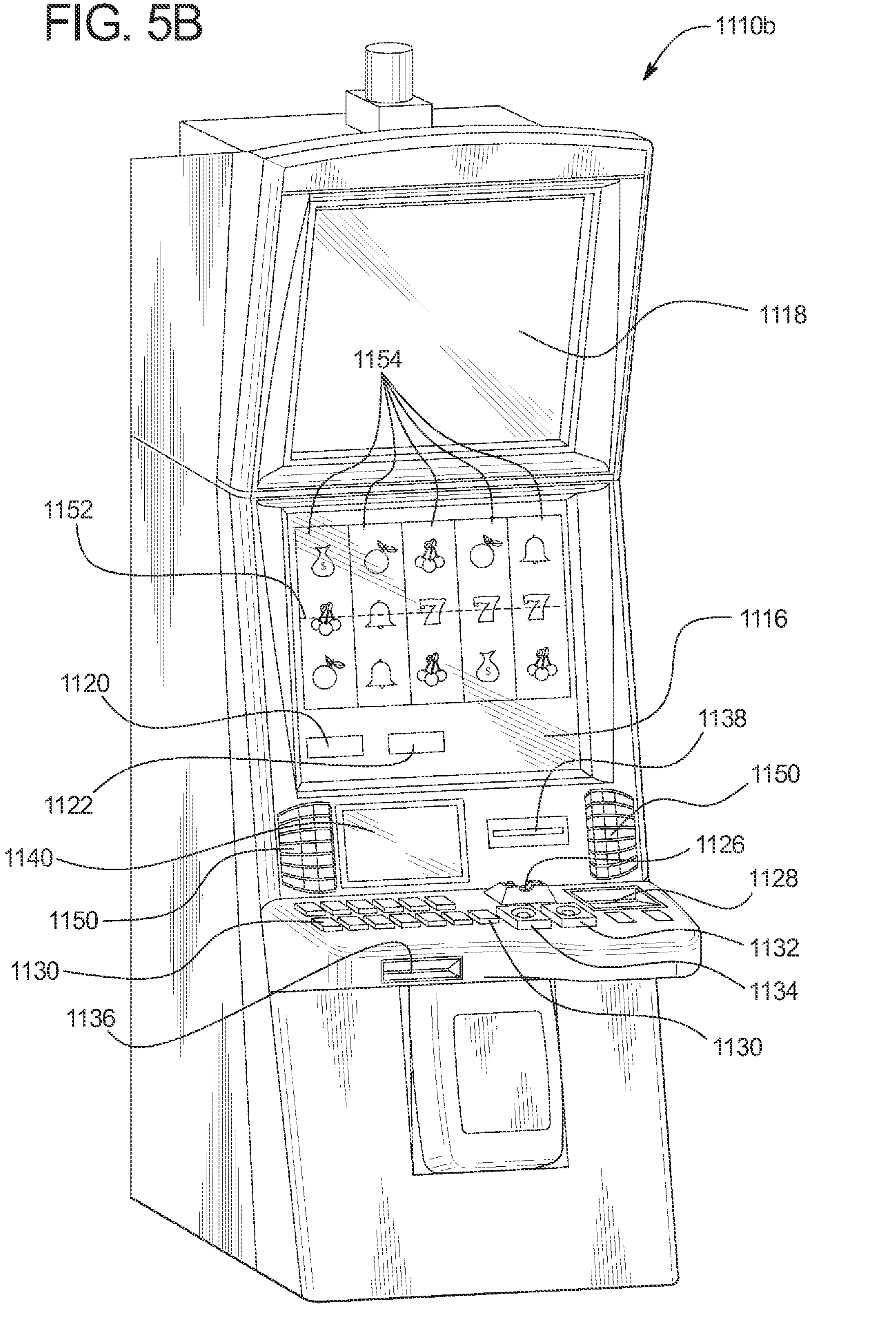

In various embodiments, the EGM includes one or more output devices. The example EGM illustrated in FIG. 4B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 5A includes a central display device 1116, a player tracking display 1140, a credit display 1120, and a bet display 1122. The example EGM illustrated in FIG. 5B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 7A and 7B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 7A and 7B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels. SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 7A and 7B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 7A and 7B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (D) a player tracking module for tracking players (as described below), and (c) a credit system for providing automated transactions. At least U.S. Pat. No. 6,913,534 and U.S. Patent Application Publication No. 2006/0281561 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 7A and 7B each include a payline 1152 and a plurality of reels 1156. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager for designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the players first name, the players surname, the player's preferred name, the player's player tracking ranking, any promotion status associated with the player's player tracking card, the player's address, the players birthday, the players anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a housing;

at least one display device supported by the housing;

a plurality of input devices supported by the housing, said plurality of input devices including:

(i) an acceptor, and (ii) a cashout device;

at least one processor; and at least one memory device which stores a plurality of instructions, which when executed by the at least one processor, cause the at least one processor to operate with the at least one display device and the plurality of input devices to:

(a) if a physical item is received via the acceptor, establish a credit balance based, at least in part, on a monetary value associated with the received physical item, (b) display, in association with a play of a first game, one of a plurality of different symbols at each of a plurality of symbol display positions, wherein the plurality of symbol display positions form at least three columns and at least three rows including a first row, a second row positioned adjacent to the first row and a third row positioned adjacent to the second row, (c) determine if any of the displayed symbols form any winning symbol combinations, (d) if any of the displayed symbols form at least one winning symbol combination, display one of a plurality of awards for each displayed winning symbol combination, (e) for each displayed symbol, determine whether said displayed symbol qualifies to be removed, (f) for each displayed symbol that qualifies to be removed, remove said symbol, (g) for each of any symbols removed from the first row of the symbol display positions, reposition at least one of the remaining displayed symbols to at least another one of the symbol display positions to create at least one empty symbol display position, (h) for each of any symbols removed from the second row of the symbol display positions, reposition at least one of the remaining displayed symbols to at least another one of the symbol display positions to create at least one empty symbol display position, (i) if any empty symbol display positions are created:

(i) for each created empty symbol display position, display one of the plurality of different symbols, and (ii) repeat (c) to (i) at least once, (j) if a second game upgrade event occurs, upgrade at least one attribute of a second game, (k) if a second game triggering event occurs and the second game upgrade event occurred, display a first play of the second game, wherein the first play of the second game is associated with any upgraded attribute of the second game, (l) if the second game triggering event occurs and the second game upgrade event did not occur, display a second play of the second game, wherein the second play of the second game is not associated with any upgraded attributes of the second game, and (m) if a cashout input is received via the cashout device, cause an initiation of any payout associated with the credit balance.

2. The gaming system of claim 1, wherein when executed by the at least one processor if any empty symbol display positions are created, the plurality of instructions cause the at least one processor to repeat (c) to (i) until no symbols qualify to be removed.

3. The gaming system of claim 1, wherein when executed by the at least one processor, the plurality of instructions cause the at least one processor to determine, for each displayed symbol, whether said symbol qualifies to be removed based on if said symbol is part of any formed winning symbol combinations.

4. The gaming system of claim 1, wherein the second game upgrade event occurs based on at least one selected from the group consisting of: one of the remaining displayed symbols being repositioned to another symbol display position, one of the remaining displayed symbols being repositioned to a designated symbol display position, a designated quantity of repeating (c) to (i), a display of a designated one of the plurality of different symbols, a displayed event associated with the play of the game and an event independent of any displayed event associated with the play of the game.

5. The gaming system of claim 1, wherein when executed by the at least one processor, the plurality of instructions cause the at least one processor to upgrade the at least one attribute of the first play of the second game by at least one selected from the group consisting of: increasing at least one positive attribute of the second game, decreasing at least one negative attribute of the second game and modifying an average expected payback of the second game.

6. The gaming system of claim 1, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

7. A method of operating a gaming system, said method comprising:

(a) causing at least one display device to display, in association with a play of a first game, one of a plurality of different symbols at each of a plurality of symbol display positions, wherein the plurality of symbol display positions form at least three columns and at least three rows including a first row, a second row positioned adjacent to the first row and a third row positioned adjacent to the second row, (b) causing at least one processor to execute a plurality of instructions to determine if any of the displayed symbols form any winning symbol combinations, (c) if any of the displayed symbols form at least one winning symbol combination, causing the at least one display device to display one of a plurality of awards for each displayed winning symbol combination, wherein a credit balance is increasable based on the displayed award for each displayed winning symbol combination, said credit balance being increasable if a physical item associated with a monetary value is received via an acceptor, and said credit balance being decreasable if a cashout input is received via a cashout device, (d) for each displayed symbol, causing the at least one processor to execute the plurality of instructions to determine whether said displayed symbol qualifies to be removed, (e) for each displayed symbol that qualifies to be removed, causing the at least one processor to execute the plurality of instructions to remove said symbol, (f) for each of any symbols removed from the first row of the symbol display positions, causing the at least one processor to execute the plurality of instructions to reposition at least one of the remaining displayed symbols to at least another one of the symbol display positions to create at least one empty symbol display position, (g) for each of any symbols removed from the second row of the symbol display positions, causing the at least one processor to execute the plurality of instructions to reposition at least one of the remaining displayed symbols to at least another one of the symbol display positions to create at least one empty symbol display position, (h) if any empty symbol display positions are created:

(i) for each created empty symbol display position, causing the at least one display device to display one of the plurality of different symbols, and (ii) repeating (b) to (h) at least once, (i) if a second game upgrade event occurs, causing the at least one processor to execute the plurality of instructions to upgrade at least one attribute of a second game, (j) if a second game triggering event occurs and the second game upgrade event occurred, causing the at least one display device to display a first play of the second game, wherein the first play of the second game is associated with any upgraded attribute of the second game, and (k) if the second game triggering event occurs and the second game upgrade event did not occur, causing the at least one display device to display a second play of the second game, wherein the second play of the second game is not associated with any upgraded attributes of the second game.

8. The method of claim 7, which includes, if any empty symbol display positions are created, repeating (b) to (h) until no symbols qualify to be removed.

9. The method of claim 7, which includes causing the at least one processor to execute the plurality of instructions to determine, for each displayed symbol, whether said symbol qualifies to be removed based on if said symbol is part of any formed winning symbol combinations.

10. The method of claim 7, wherein the second game upgrade event occurs based on at least one selected from the group consisting of: one of the remaining displayed symbols being repositioned to another symbol display position, one of the remaining displayed symbols being repositioned to a designated symbol display position, a designated quantity of repeating (b) to (h), a display of a designated one of the plurality of different symbols, a displayed event associated with the play of the game and an event independent of any displayed event associated with the play of the game.

11. The method of claim 7, which includes causing the at least one processor to execute the plurality of instructions to upgrade the at least one attribute of the first play of the second game by at least one selected from the group consisting of: increasing at least one positive attribute of the second game, decreasing at least one negative attribute of the second game and modifying an average expected payback of the second game.

12. The method of claim 7, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

13. The method of claim 7, which is executed through a data network.

14. The method of claim 13, wherein the data network is an internet.

15. A gaming system server comprising:

at least one processor; and at least one memory device which stores a plurality of instructions, which when executed by the at least one processor, cause the at least one processor to:

(a) cause at least one display device to display, in association with a play of a first game, one of a plurality of different symbols at each of a plurality of symbol display positions, wherein the plurality of symbol display positions form at least three columns and at least three rows including a first row, a second row positioned adjacent to the first row and a third row positioned adjacent to the second row, (b) determine if any of the displayed symbols form any winning symbol combinations, (c) if any of the displayed symbols form at least one winning symbol combination, cause the at least one display device to display one of a plurality of awards for each displayed winning symbol combination, wherein a credit balance is increasable based on the displayed award for each displayed winning symbol combination, said credit balance being increasable if a physical item associated with a monetary value is received via an acceptor, and said credit balance being decreasable if a cashout input is received via a cashout device, (d) for each displayed symbol, determine whether said displayed symbol qualifies to be removed, (e) for each displayed symbol that qualifies to be removed, remove said symbol, (f) for each of any symbols removed from the first row of the symbol display positions, reposition at least one of the remaining displayed symbols to at least another one of the symbol display positions to create at least one empty symbol display position, (g) for each of any symbols removed from the second row of the symbol display positions, reposition at least one of the remaining displayed symbols to at least another one of the symbol display positions to create at least one empty symbol display position, (h) if any empty symbol display positions are created:

(i) for each created empty symbol display position, cause the at least one display device to display one of the plurality of different symbols, and (ii) repeat (b) to (h) at least once, (i) if a second game upgrade event occurs, upgrade at least one attribute of a second game, (j) if a second game triggering event occurs and the second game upgrade event occurred, cause the at least one display device to display a first play of the second game, wherein the first play of the second game is associated with any upgraded attribute of the second game, and (k) if the second game triggering event occurs and the second game upgrade event did not occur, cause the at least one display device to display a second play of the second game, wherein the second play of the second game is not associated with any upgraded attributes of the second game.

16. The gaming system server of claim 15, wherein when executed by the at least one processor if any empty symbol display positions are created, the plurality of instructions cause the at least one processor to repeat (b) to (h) until no symbols qualify to be removed.

17. The gaming system server of claim 15, wherein when executed by the at least one processor, the plurality of instructions cause the at least one processor to determine, for each displayed symbol, whether said symbol qualifies to be removed based on if said symbol is part of any formed winning symbol combinations.

18. The gaming system server of claim 15, wherein the second game upgrade event occurs based on at least one selected from the group consisting of: one of the remaining displayed symbols being repositioned to another symbol display position, one of the remaining displayed symbols being repositioned to a designated symbol display position, a designated quantity of repeating (b) to (h), a display of a designated one of the plurality of different symbols, a displayed event associated with the play of the game and an event independent of any displayed event associated with the play of the game.

19. The gaming system server of claim 15, wherein when executed by the at least one processor, the plurality of instructions cause the at least one processor to upgrade the at least one attribute of the first play of the second game by at least one selected from the group consisting of: increasing at least one positive attribute of the second game, decreasing at least one negative attribute of the second game and modifying an average expected payback of the second game.

20. The gaming system server of claim 15, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

* * * * *